United States Patent
Fujii

(10) Patent No.: US 12,238,434 B2
(45) Date of Patent: Feb. 25, 2025

(54) IMAGING DEVICE AND IMAGING METHOD FOR AUTOFOCUS CONTROL

(71) Applicant: SONY GROUP CORPORATION, Tokyo (JP)

(72) Inventor: Shinichi Fujii, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 105 days.

(21) Appl. No.: 17/999,058

(22) PCT Filed: Apr. 6, 2021

(86) PCT No.: PCT/JP2021/014669
§ 371 (c)(1),
(2) Date: Nov. 17, 2022

(87) PCT Pub. No.: WO2021/241015
PCT Pub. Date: Dec. 2, 2021

(65) Prior Publication Data
US 2023/0199342 A1  Jun. 22, 2023

(30) Foreign Application Priority Data

May 25, 2020  (JP) .................................. 2020-090343

(51) Int. Cl.
*H04N 25/704* (2023.01)
*H04N 25/706* (2023.01)

(52) U.S. Cl.
CPC ......... *H04N 25/704* (2023.01); *H04N 25/706* (2023.01)

(58) Field of Classification Search
CPC .... H04N 25/704; H04N 25/706; H04N 25/44; H04N 25/531; G02B 7/28; G02B 7/34; G03B 13/36
See application file for complete search history.

(56) References Cited

U.S. PATENT DOCUMENTS

2018/0124347 A1* 5/2018 Gomi .................... H04N 25/532
2019/0082131 A1* 3/2019 Hatakeyama .......... H04N 25/42
(Continued)

FOREIGN PATENT DOCUMENTS

JP  2018-081224 A  5/2018
JP  2019-050486 A  3/2019
(Continued)

OTHER PUBLICATIONS

International Search Report and Written Opinion of PCT Application No. PCT/JP2021/014669, issued on Jul. 6, 2021, 09 pages of ISRWO.

*Primary Examiner* — Gevell V Selby
(74) *Attorney, Agent, or Firm* — CHIP LAW GROUP

(57) ABSTRACT

An imaging device includes an imaging element including a photodiode division pixel, and a control unit. The control unit performs control such that, as reading corresponding to one frame of an image in a case where rolling shutter reading from the imaging element is performed, first reading that reads an addition value of a first pixel and a second pixel constituting the photodiode division pixel for all pixels as image generation targets, and second reading that can obtain a value of the first pixel and a value of the second pixel for some pixels of pixels as image generation targets are performed in a time division manner, and an exposure period for the first reading and an exposure period for the second reading are separately provided.

15 Claims, 21 Drawing Sheets

(56) References Cited

U.S. PATENT DOCUMENTS

2021/0044733 A1\* 2/2021 Usami .................... H04N 23/15
2021/0075979 A1\* 3/2021 Seki ....................... H04N 25/70

FOREIGN PATENT DOCUMENTS

| WO | WO-2019003374 A1 | 1/2019 |
| WO | 2019/035374 A1 | 2/2019 |

\* cited by examiner

IMAGING DEVICE AND IMAGING METHOD FOR AUTOFOCUS CONTROL

CROSS REFERENCE TO RELATED APPLICATIONS

This application is a U.S. National Phase of International Patent Application No. PCT/JP2021/014669 filed on Apr. 6, 2021, which claims priority benefit of Japanese Patent Application No. JP 2020-090343 filed in the Japan Patent Office on May 25, 2020. Each of the above-referenced applications is hereby incorporated herein by reference in its entirety.

TECHNICAL FIELD

The present technology relates to an imaging device and an imaging method including an imaging element having a pixel group that outputs a phase difference signal.

BACKGROUND ART

Some imaging devices have a function of acquiring focus information on a subject in order to perform autofocus control. As such an imaging device, for example, an imaging device including pixels for detecting a focal point is known.

Patent Document 1 discloses a technique of reading a plurality of image signals subjected to pupil division in an imaging element to perform focal point detection, and controlling a reading row for acquiring the plurality of image signals to change the reading row of focal point detection pixels according to an accumulation time or sensitivity setting of the imaging element.

CITATION LIST

Patent Document

Patent Document 1: JP 2018-81224 A

SUMMARY OF THE INVENTION

Problems to be Solved by the Invention

A case where rolling shutter reading from an imaging element is performed will be considered. During reading corresponding to one frame of an image, a plurality of image signals (pixel values) subjected to pupil division can be read by pixels according to a photodiode (PD) division method. For the reading, it is known to perform reading of one pixel further divided for a PD division pixel on a certain line while reading an addition value of the PD division pixels as normal pixel reading. For this reason, in one vertical period (also referred to as "1V"), reading of a certain line is performed twice. As a result, an unnatural edge may occur in an image, particularly an image of a moving subject.

Therefore, in the present technology, the read operation of the imaging element including the PD division pixels is devised to prevent an unnatural image from being generated.

Solutions to Problems

An imaging device according to the present technology includes: an imaging element including a photodiode division pixel; and a control unit that performs control such that, as reading corresponding to one frame of an image in a case where rolling shutter reading from the imaging element is performed, first reading that reads an addition value of a first pixel and a second pixel constituting the photodiode division pixel for all pixels as image generation targets, and second reading that can obtain a value of the first pixel and a value of the second pixel for some pixels of pixels as image generation targets are performed in a time division manner, and an exposure period for the first reading and an exposure period for the second reading are separately provided.

The photodiode division pixel (PD division pixel) becomes a pixel used for image generation by reading the addition value of the first pixel and the second pixel. In order to obtain each value of the first pixel and the second pixel, the second reading is performed separately from the first reading.

In the imaging device of the present technology described above, it is conceivable to perform processing of generating an image on the basis of the addition value obtained in the first reading, and perform phase difference demodulation processing using the value of the first pixel and the value of the second pixel obtained in the second reading.

Reading for image generation is performed as the first reading, and reading for phase difference demodulation is performed as the second reading.

In the imaging device of the present technology described above, it is conceivable that the control unit causes the second reading to be executed after the first reading is completed as reading corresponding to one frame of an image.

For example, first, reading for image generation is performed in the first reading, and subsequently, the second reading is performed for focus control in a subsequent frame.

In the imaging device of the present technology described above, it is conceivable that the control unit causes the first reading to be executed after the second reading is completed as reading corresponding to one frame of an image.

For example, first, the second reading is performed for focus control in a subsequent frame, and subsequently, the second reading for image generation is performed.

In the imaging device of the present technology described above, it is conceivable that the control unit starts exposure for the second reading before the first reading is completed.

Even in the middle of the first reading, the exposure for the second reading is started since the line for which the reading has been completed can be exposed.

In the imaging device of the present technology described above, it is conceivable that the control unit ends the second reading during the exposure for the first reading.

That is, the second reading is performed in parallel with the exposure for the first reading, and is completed during the period of the exposure for the first reading.

In the imaging device of the present technology described above, in the second reading, it is conceivable to perform reading of a value of one of the first pixel or the second pixel and reading of the addition value of the first pixel and the second pixel.

By reading the addition value of the first pixel and the second pixel and a value of one of the pixels, the value of the other pixel can also be calculated, and the value of the first pixel and the value of the second pixel can be obtained.

In the imaging device of the present technology described above, it is conceivable that the imaging element includes a light shielding pixel including a light shielding portion that shields one of a pair of light fluxes having passed through a pair of partial regions deviated in opposite directions to each other in a predetermined direction in an exit pupil and a light receiving element that receives another light flux, the light shielding pixel having a pupil division function, the control unit controls to perform third reading of reading the light shielding pixel, and phase difference demodulation processing is performed using a value of the light shielding pixel obtained in the third reading.

The light shielding pixel is, for example, either a pixel on which only light that has passed through the left side region that is the region of the left half portion of the exit pupil by the light shielding portion is incident or a pixel on which only light that has passed through the right side region that is the region of the right half portion of the exit pupil by the light shielding portion is incident.

In the imaging device according to the present technology described above, as reading corresponding to one frame of an image, it is conceivable that the third reading is performed before the second reading.

The reading of the light shielding pixel as the third reading and the second reading are performed before and after in a time division manner.

In the imaging device according to the present technology described above, as reading corresponding to one frame of an image, it is conceivable that the second reading is performed before the third reading.

The second reading and the reading of the light shielding pixel as the third reading are performed before and after in a time division manner.

In the imaging device of the present technology described above, it is conceivable that the third reading is performed together with the first reading.

The photodiode division pixel is used as a pixel for pixel generation, and the light shielding pixel is also read at the time of reading the pixel.

In the imaging device according to the present technology described above, it is conceivable to perform focus control by using one of a result of phase difference demodulation processing based on the second reading or a result of phase difference demodulation processing based on the third reading, whichever has higher reliability.

Focus control is performed by selectively using either a defocus amount calculated as a phase difference demodulation result by the light shielding pixel or a defocus amount calculated as a phase difference demodulation result by the photodiode division pixel.

In the imaging device of the present technology described above, it is conceivable that a thinning rate for setting some pixels to be read in the second reading is variably set.

In the second reading, the values of the first pixel and the second pixel are obtained from thinned pixels and used for autofocus control, but the thinning rate is changed according to various conditions.

In the imaging device of the present technology described above, it is conceivable that the first reading and the second reading are performed in a time division manner in a case where still image continuous shooting imaging is performed.

In the case of continuous shooting imaging of still images, the first reading and the second reading are performed in a time-division manner as processing of each frame to be continuously shot.

An imaging method according to the present technology is an imaging method of an imaging device including an imaging element including a photodiode division pixel. As reading corresponding to one frame of an image in a case where rolling shutter reading from the imaging element is performed, first reading that reads an addition value of a first pixel and a second pixel constituting the photodiode division pixel for all pixels as image generation targets, and second reading that can obtain a value of the first pixel and a value of the second pixel for some pixels of pixels as image generation targets are performed in a time division manner, and an exposure period for the first reading and an exposure period for the second reading are separately provided.

As a result, an imaging device that performs the first reading and the second reading separately is implemented.

MODE FOR CARRYING OUT THE INVENTION

Hereinafter, embodiments will be described in the following order with reference to the accompanying drawings.
<1. Configuration of Imaging Device>
<2. Read Operation of Comparative Example>
<3. Read Operation of First Embodiment>
<4. Read Operation of Second Embodiment>
<5. Read Operation of Third Embodiment>
<6. Read Operation of Fourth Embodiment>
<7. Read Operation of Fifth Embodiment>
<8. Conclusion and Modifications>

<1. Configuration of Imaging Device>

Figure 1:
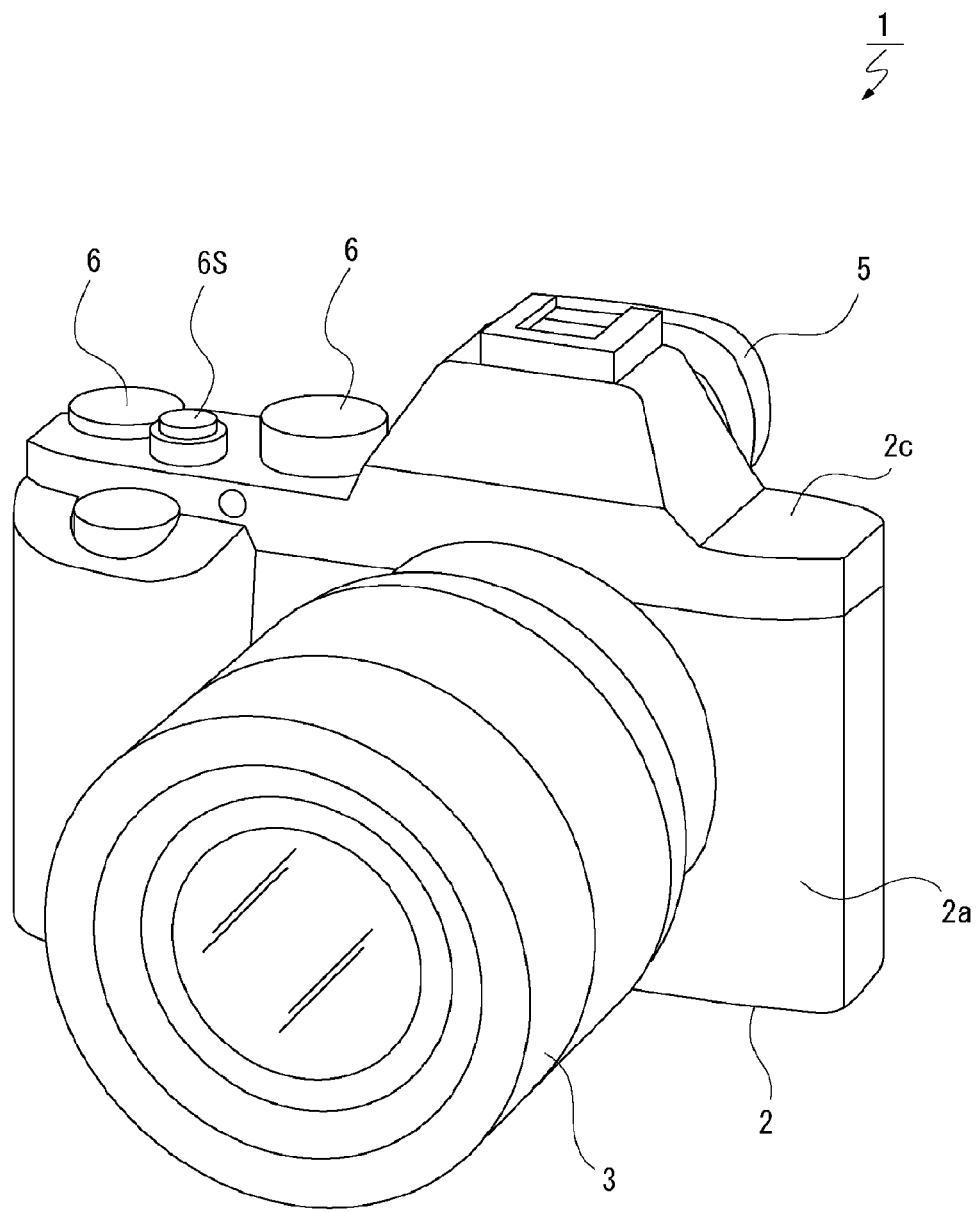
FIG. 1 is a perspective view of an imaging device according to an embodiment of the present technology.
Figure 2:
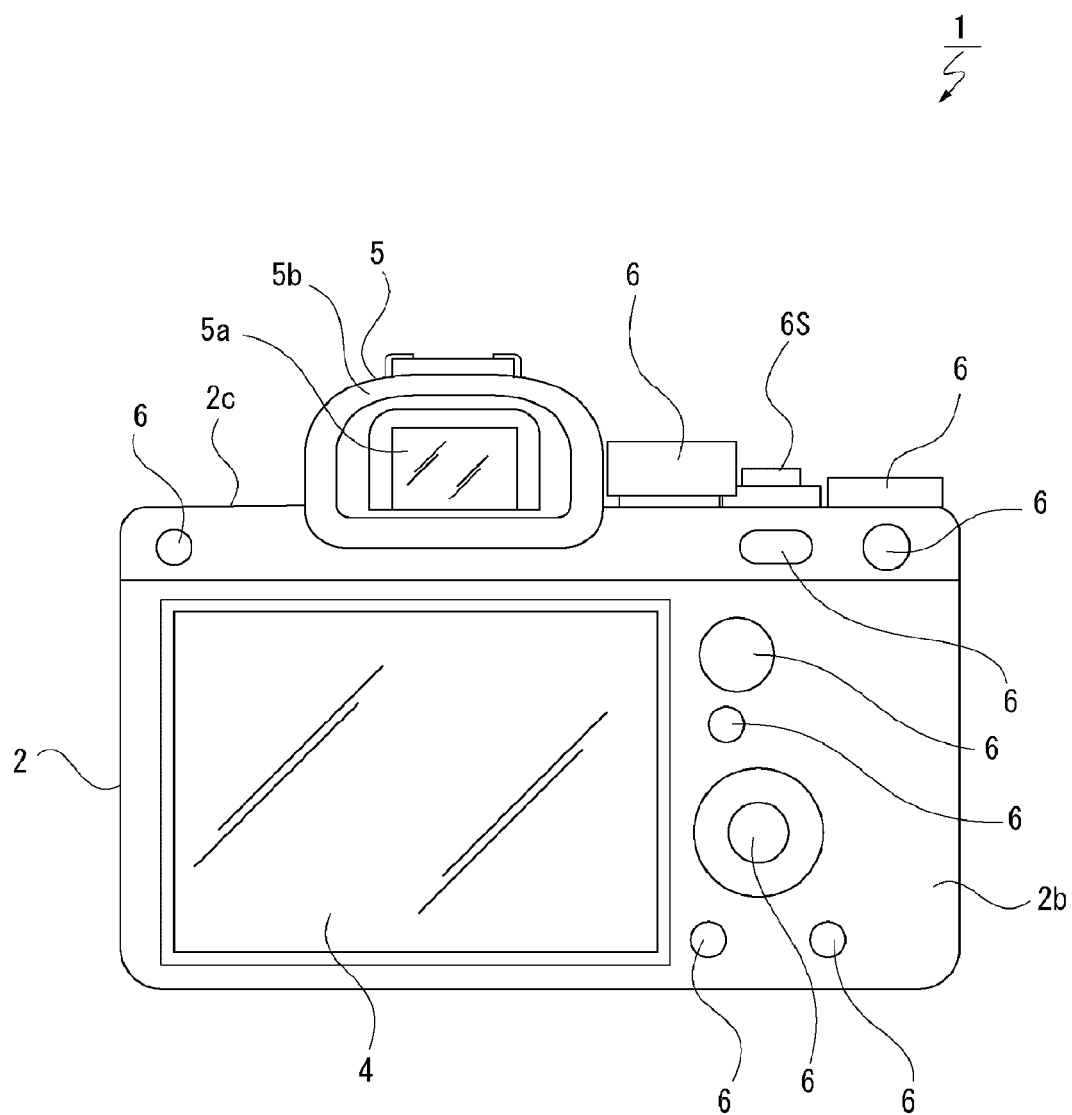
FIG. 2 is a rear view of the imaging device according to the embodiment.

An external appearance of an imaging device 1 according to the present embodiment is illustrated in FIGS. 1 and 2.

Note that, in each of the following examples, description will be made with the subject side as the front and the imaging person side as the rear, but these directions are for convenience of description, and the implementation of the present technology is not limited to these directions.

As illustrated in FIGS. 1 and 2, the imaging device 1 includes a camera housing 2 in which each necessary unit is disposed inside and outside, and a lens barrel 3 that is detachable from the camera housing 2 and is attached to a front surface portion 2a. Note that the lens barrel 3 is detachable as a so-called interchangeable lens only by way of example, and may be a lens barrel that cannot be removed from the camera housing 2.

A rear monitor 4 is disposed on a rear surface portion 2b of the camera housing 2. The rear monitor 4 displays a live view image, a reproduced image of a recorded image, and the like.

The rear monitor 4 is, for example, a display device such as a liquid crystal display (LCD), an organic electro-luminescence (EL) display, or the like.

The rear monitor 4 is rotatable with respect to the camera housing 2. For example, the upper end portion of the rear monitor 4 is set as a rotation axis, and the lower end portion of the rear monitor 4 is rotatable so as to move backward.

Note that the right end portion or the left end portion of the rear monitor 4 may be used as a rotation axis. Moreover, it may be rotatable around a plurality of axes.

An electric viewfinder (EVF) 5 is disposed on an upper surface portion 2c of the camera housing 2. The EVF 5 includes an EVF monitor 5a and a frame-shaped enclosure 5b protruding rearward so as to surround the upper and left and right sides of the EVF monitor 5a.

The EVF monitor 5a is formed using an LCD, an organic EL display, or the like. Note that an optical view finder (OVF) may be provided instead of the EVF monitor 5a.

Various operators 6 are provided on the rear surface portion 2b and the upper surface portion 2c. Examples of the operators 6 include, for example, a playback menu activation button, an enter button, a cross key, a cancel button, a zoom key, a slide key, a shutter button 6S (release button), and the like.

The various operators 6 include various modes such as a button, a dial, a pressing and rotatable composite operator, and the like. With the operators 6 of various modes, for example, a menu operation, a reproduction operation, a mode selection/switching operation, a focus operation, a zoom operation, and parameter selection/setting such as a shutter speed, an F value, and the like can be performed.

Figure 3:
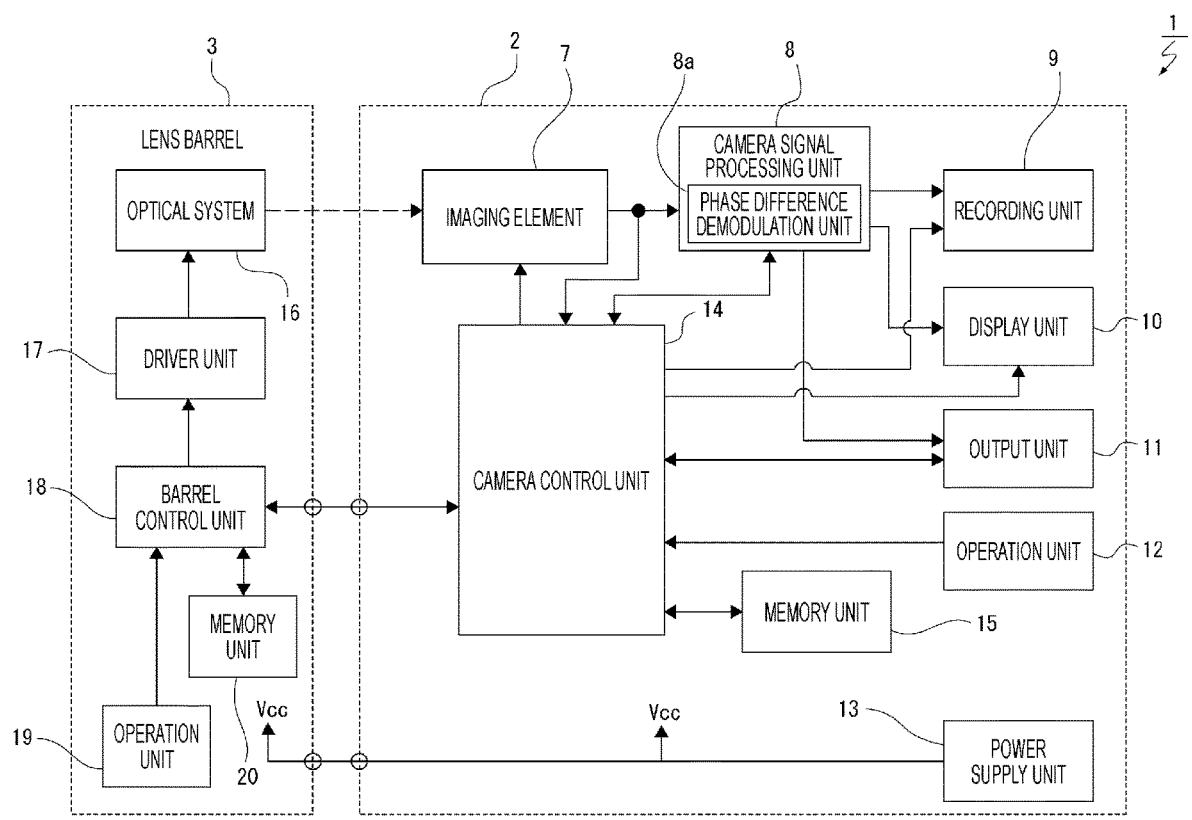
FIG. 3 is a block diagram of a configuration of the imaging device according to the embodiment.
Figure 4:
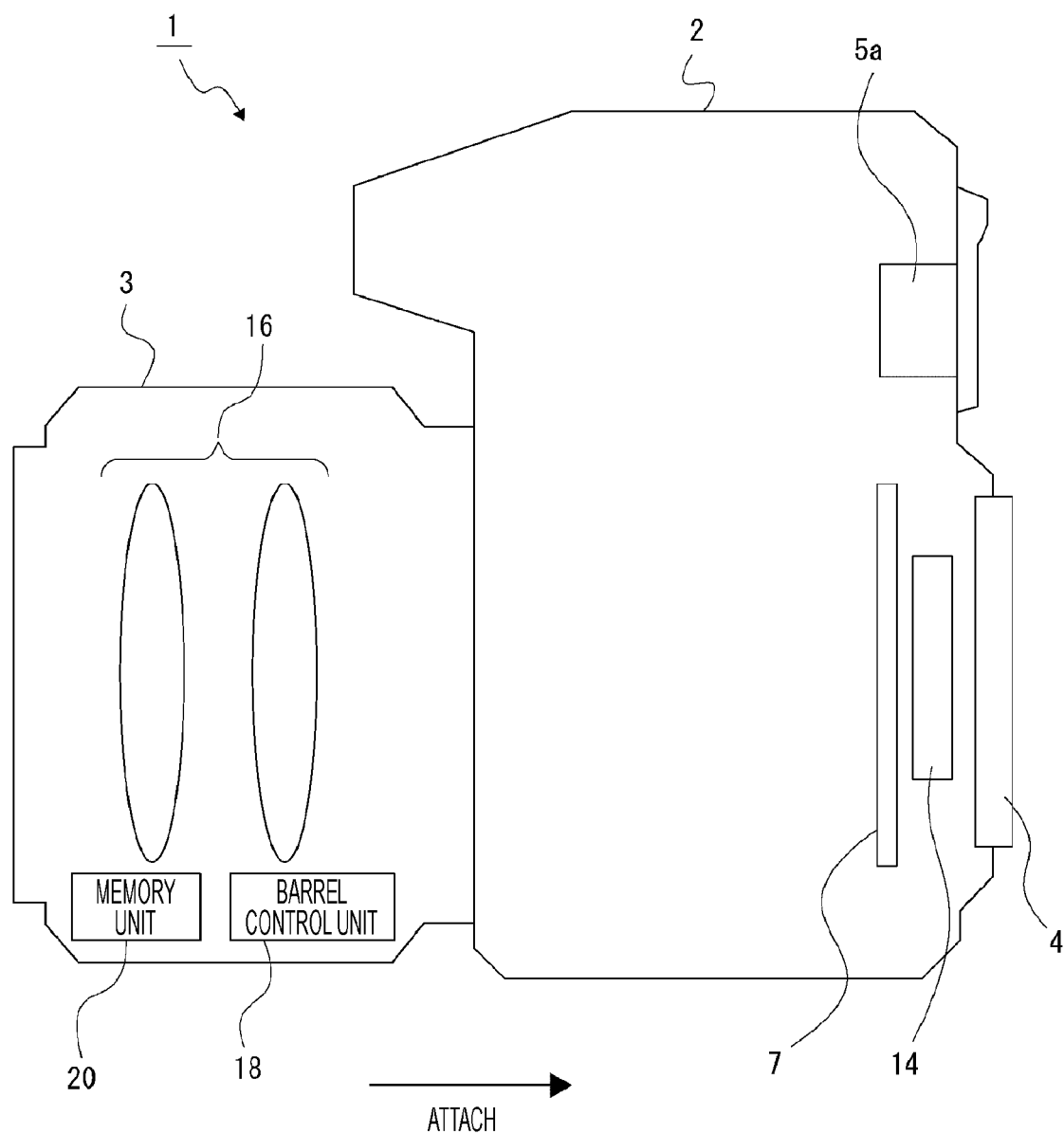
FIG. 4 is an explanatory diagram of a configuration in a lens barrel of the imaging device according to the embodiment.

An internal configuration of such an imaging device 1 is illustrated in FIG. 3. In addition, FIG. 4 illustrates an arrangement example of a part of the configuration of FIG. 3.

An imaging element 7, a camera signal processing unit 8, a recording unit 9, a display unit 10, an output unit 11, an operation unit 12, a power supply unit 13, a camera control unit 14, a memory unit 15, and the like are provided inside and outside the camera housing 2 of the imaging device 1.

The lens barrel 3 includes an optical system 16, a driver unit 17, a barrel control unit 18, an operation unit 19, a memory unit 20, and the like.

The optical system 16 includes various lenses such as an incident end lens, a zoom lens, a focus lens, a condenser lens, and the like, an aperture mechanism that performs exposure control by adjusting an aperture amount or the like of a lens or an iris (diaphragm) so that sensing is performed in a state where signal charges are not saturated and are within a dynamic range, and a shutter unit such as a focal plane shutter or the like.

Note that a part of each unit constituting the optical system 16 may be provided in the camera housing 2.

The imaging element 7 is of a charge coupled device (CCD) type or a complementary metal-oxide semiconductor (CMOS) type, for example, and controls exposure of light from a subject incident through the optical system 16. A processing unit that performs, for example, correlated double sampling (CDS) processing, automatic gain control (AGC) processing, and analog/digital (A/D) conversion processing on the electric signal photoelectrically converted by the pixel is provided. Therefore, the imaging element 7 outputs a captured image signal as digital data to the camera signal processing unit 8 and the camera control unit 14.

The sensor surface of the imaging element 7 includes a sensing element in which a plurality of pixels is two-dimensionally arranged.

Figure 5:
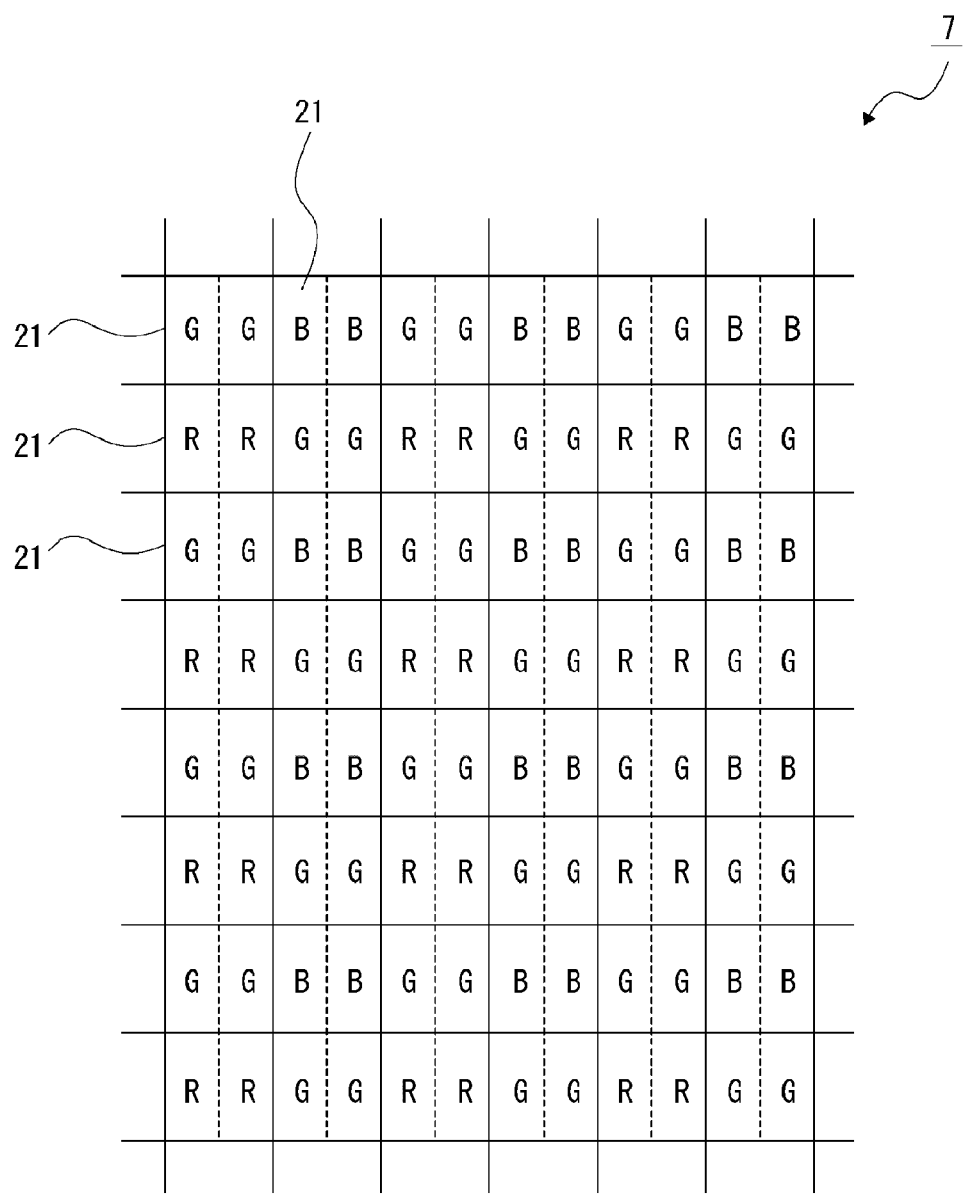
FIG. 5 is an explanatory diagram of an imaging element including PD division pixels according to the embodiment.

As illustrated in FIG. 5, the imaging element 7 is formed by arranging PD division pixels 21 on a matrix in the row direction and the column direction. Each of the PD division pixels 21 includes two division pixels.

Figure 6:
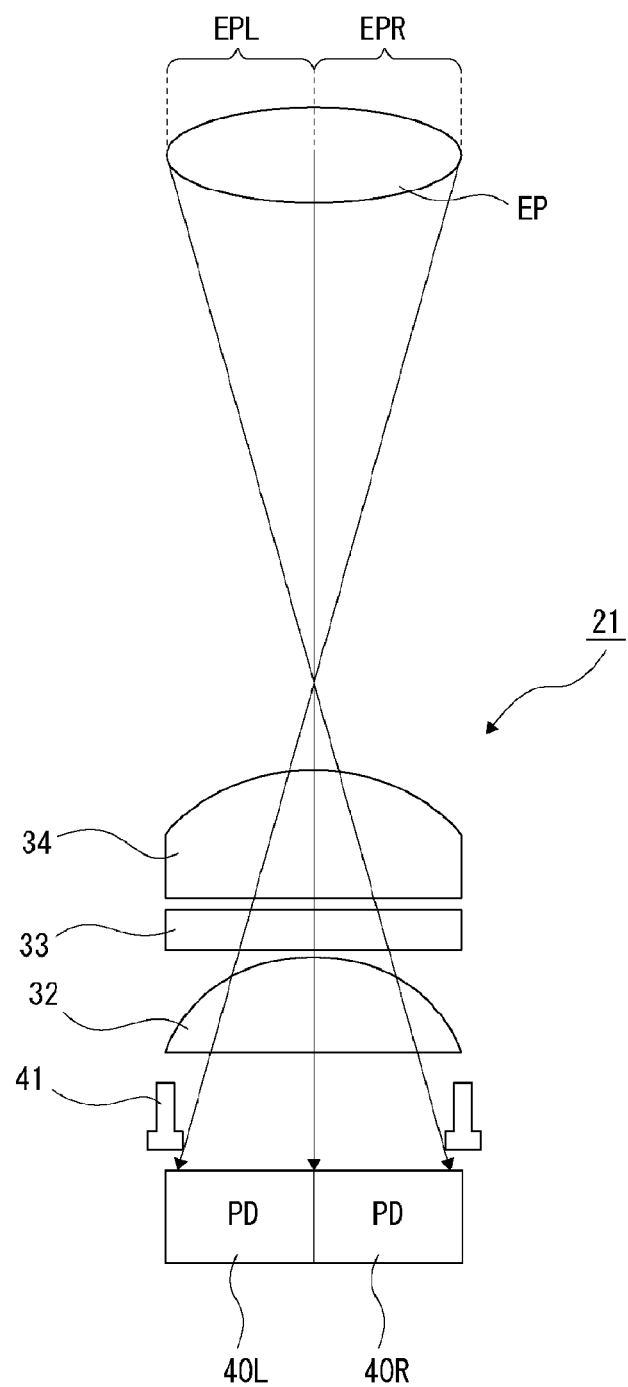
FIG. 6 is an explanatory diagram of a configuration example of a PD division pixel disposed in an on-axis region.

FIG. 6 schematically illustrates a configuration of the PD division pixel 21.

The PD division pixel 21 includes two division pixels, that is, a left PD 40L as a left division pixel, a right PD 40R as a right division pixel, a pixel boundary metal 41 disposed in front of the division pixels, an inner lens 32, a color filter 33, and an on-chip microlens 34. The color filter 33 is any one of a color filter 33R having spectral sensitivity of red (R), a color filter 33G having spectral sensitivity of green (G), or a color filter 33B having spectral sensitivity of blue (B). Note that there is also a configuration example in which the inner lens 32 and the like are not provided.

As illustrated, the left PD 40L receives light that has passed through a right pupil region EPR of an exit pupil EP. The right PD 40R receives light that has passed through a left pupil region EPL. Therefore, the pupil division function is implemented.

Such PD division pixels 21 are arranged as an R pixel, a G pixel, and a B pixel as illustrated in FIG. 5 due to the difference in the color filter 33.

For example, in the case of a G pixel as one PD division pixel 21, a signal obtained as an addition value of the left PD 40L and the right PD 40R is a signal of one G pixel. In addition, phase difference demodulation can be performed based on the values of the left PD 40L and the right PD 40R.

Returning to FIG. 3, the description will be given. The camera signal processing unit 8 includes, for example, a microprocessor specialized in digital signal processing such as a digital signal processor (DSP), a microcomputer, or the like.

The camera signal processing unit 8 performs various types of signal processing on the digital signal (captured image signal) transmitted from the imaging element 7.

Specifically, processing such as correction processing between R, G, and B color channels, white balance correction, aberration correction, shading correction, and the like is performed.

Furthermore, the camera signal processing unit 8 performs YC generation processing of generating (separating) a luminance (Y) signal and a color (C) signal from the image data of R, G, and B, processing of adjusting luminance and color, and each processing such as knee correction, gamma correction, and the like.

Moreover, the camera signal processing unit 8 performs conversion into a final output format by performing resolution conversion processing, codec processing for performing encoding for recording or communication, and the like. The image data converted into the final output format is stored in the memory unit 15. Furthermore, when the image data is output to the display unit 10, an image is displayed on the rear monitor 4 or the EVF monitor 5a. Moreover, by being output from the external output terminal, it is displayed on a device such as a monitor or the like provided outside the imaging device 1.

The camera signal processing unit 8 includes a phase difference demodulation unit 8a.

The phase difference demodulation unit 8a performs phase difference demodulation from output signals of the left PD 40L and the right PD 40R of the PD division pixel 21. Then, the phase difference demodulation unit 8a calculates the defocus amount on the basis of the detected phase difference information. The calculated defocus amount may be used for an autofocus (AF) function by being used for driving a focus lens included in the optical system 16 via the barrel control unit 18. Furthermore, the defocus amount may be used to present information regarding the degree of focus of the subject to the user.

The recording unit 9 includes, for example, a nonvolatile memory, and stores image files (content files) such as still image data, moving image data, and the like, attribute information of the image files, thumbnail images, and the like.

The image file is stored in a format such as joint photographic experts group (JPEG), tagged image file format (TIFF), graphics interchange format (GIF), or the like, for example.

Various actual forms of the recording unit 9 can be considered. For example, the recording unit 9 may be configured as a flash memory built in the imaging device 1, or may be configured by a memory card (for example, a portable flash memory) that can be detached from the imaging device 1 and an access unit that accesses the memory card for storage and reading. In addition, as a form incorporated in the imaging device 1, the imaging device 1 may be implemented as a hard disk drive (HDD) or the like.

The display unit 10 executes processing for performing various displays for the imaging person. The display unit 10 is, for example, the rear monitor 4 or the EVF monitor 5a. The display unit 10 performs processing of displaying the image data converted to an appropriate resolution input from the camera signal processing unit 8. Therefore, a live view image (also referred to as a through image) which is a captured image during standby of the release is displayed.

Moreover, the display unit 10 implements display of various operation menus, icons, messages, and the like as a graphical user interface (GUI) on the screen on the basis of an instruction from the camera control unit 14.

Furthermore, the display unit 10 can display a reproduced image of the image data read from the recording medium in the recording unit 9.

Note that, in the present example, both the EVF monitor 5a and the rear monitor 4 are provided, but the embodiment of the present technology is not limited to such a configuration, and only one of the EVF monitor 5a or the rear monitor 4 may be provided, or one or both of the EVF monitor 5a and the rear monitor 4 may be configured to be detachable.

The output unit 11 performs data communication or network communication with an external device in a wired or wireless manner. For example, captured image data (a still image file or a moving image file) is transmitted to an external display device, recording device, reproduction device, or the like.

Furthermore, the output unit 11 may function as a network communication unit. For example, communication may be performed by various networks such as the Internet, a home network, a local area network (LAN), and the like, and various data may be transmitted and received to and from a server, a terminal, or the like on the network.

The operation unit 12 provided in the camera housing 2 includes not only the above-described various operators 6 but also the rear monitor 4 adopting a touch panel system and the like, and outputs operation information corresponding to various operations such as a tap operation, a swipe operation, and the like of the imaging person to the camera control unit 14.

Note that the operation unit 12 may function as a reception unit of an external operation device such as a remote controller separate from the imaging device 1 or the like.

The power supply unit 13 generates a power supply voltage (Vcc) necessary for each unit from, for example, a battery filled inside, and supplies the generated power supply voltage as an operating voltage.

In a state where the lens barrel 3 is attached to the imaging device 1, the power supply voltage Vcc generated by the power supply unit 13 is also supplied to a circuit in the lens barrel 3.

Note that the power supply unit 13 may be formed with a circuit that charges a battery or a circuit that generates a power supply voltage Vcc using a DC voltage converted and input by an AC adapter connected to a commercial AC power supply as a power supply.

The camera control unit 14 includes a microcomputer (arithmetic processing device) including a central processing unit (CPU), and performs overall control of the imaging device 1. For example, control of the shutter speed according to the operation of the imaging person, an instruction on various types of signal processing in the camera signal processing unit 8, an imaging operation or recording operation according to the operation of the user, and reproduction operation of the recorded image file are performed.

The camera control unit 14 switches various imaging modes and the like. Examples of the various imaging modes include, for example, a still image imaging mode, a moving image imaging mode, a continuous shooting mode for continuously acquiring still images, and the like.

The camera control unit 14 includes a user interface control unit (UI control unit) 14a for enabling the user to operate these functions. The UI control unit 14a performs processing of detecting an operation on each operator 6 provided in the imaging device 1, display processing on the rear monitor 4, operation detection processing, and the like.

Furthermore, the camera control unit 14 instructs the barrel control unit 18 to control various lenses included in the optical system 16.

For example, processing of designating an aperture value in order to secure a light amount necessary for AF control, an operation instruction of an aperture mechanism according to the aperture value, and the like are performed.

The camera control unit 14 can acquire information on various lenses included in the optical system 16 via the barrel control unit 18. The information of the lens includes, for example, information of a model number of the lens, a position of the zoom lens, an F value, or information of an exit pupil position, and the like. Furthermore, the camera control unit 14 can acquire an aperture value of the aperture mechanism included in the optical system 16.

The memory unit 15 stores information and the like used for processing executed by the camera control unit 14. As the illustrated memory unit 15, for example, a read only memory (ROM), a random access memory (RAM), a flash memory, and the like are comprehensively illustrated.

The memory unit 15 may be a memory area built in a microcomputer chip as the camera control unit 14 or may be configured by a separate memory chip.

Programs and the like used by the camera control unit 14 are stored in the ROM, the flash memory, and the like of the memory unit 15. The ROM, the flash memory, and the like store an operating system (OS) for the CPU to control each unit, content files such as image files, and application programs, firmware, and the like for various operations.

The camera control unit 14 executes the program to control the entire imaging device 1 and the lens barrel 3.

The RAM of the memory unit 15 is used as a work area of the camera control unit 14 by temporarily storing data, programs, and the like used in various data processing executed by the CPU of the camera control unit 14.

The barrel control unit 18 of the lens barrel 3 includes, for example, a microcomputer, and outputs a control signal to the driver unit 17 to actually drive various lenses of the optical system 16 on the basis of an instruction from the camera control unit 14.

Note that information communication between the camera control unit 14 and the barrel control unit 18 may be enabled only in a state where the lens barrel 3 is attached to the camera housing 2, or may be enabled in a state where the lens barrel 3 is not attached to the camera housing 2 by wireless communication.

The barrel control unit 18 transmits information on the exit pupil position and the pupil distance of the exit pupil to the camera control unit 14 on the basis of types and drive positions of various lenses included in the optical system 16. Specifically, information regarding the pupil distance is acquired from the information stored in the ROM as the memory unit 20 and transmitted to the camera control unit 14.

The driver unit 17 is provided with, for example, a motor driver for a zoom lens drive motor, a motor driver for a focus lens drive motor, an aperture mechanism driver for a motor that drives an aperture mechanism, and the like.

Each driver supplies a drive current to a corresponding drive motor in response to an instruction from the barrel control unit 18.

The operation unit 19 of the lens barrel 3 represents an operator provided on the lens barrel 3 side. The operation information by the operation unit 19 is supplied to the barrel control unit 18, and is notified to the camera control unit 14 via the barrel control unit 18.

Operation control of the optical system 16 by the barrel control unit 18 and various settings and operation control by the camera control unit 14 are performed according to the operation of the operation unit 19.

The operation unit 19 may function as a reception unit of an external operation device such as a remote controller separate from the lens barrel 3 or the like.

The memory unit 20 includes a ROM, a flash memory, and the like, and stores programs, data, and the like used by the barrel control unit 18. The memory unit 20 stores an operating system (OS) for the CPU to control each unit, application programs for various operations, firmware, and the like.

Furthermore, the information stored in the memory unit 20 includes information such as the pupil distance of the exit pupil of the optical system 16 or the like.

<2. Read Operation of Comparative Example>

Here, as a comparative example, it will be described that unnatural distortion (zigzag-shaped line) is generated in the longitudinal direction of the subject in the rolling shutter reading from the imaging element 7 including the PD division pixels 21.

In the case of the imaging element 7 in which the PD division pixels 21 having the left PD 40L and the right PD 40R are arranged as illustrated in FIG. 5, in each PD division pixel 21, not only a pixel signal for image generation can be read, but also pixel values of the left and right PDs can be separately obtained, and a phase difference signal can be obtained. A defocus amount can be calculated by the phase difference signal, and autofocus (AF) control can be executed.

For this reason, it is conceivable to perform reading twice for one horizontal line so as to perform, for example, L reading and (L+R) reading for one PD division pixel 21.

Note that "(L+R) reading" refers to reading obtained by adding charges from the left PD 40L and the right PD 40R. "L reading" indicates charge reading from the left PD 40L, and "R reading" indicates charge reading from the right PD 40R. In addition, "L value" is a pixel signal value obtained by direct reading or calculation from the left PD 40L, and "R value" is a pixel signal value obtained by direct reading or calculation from the right PD 40R. In addition, the (L+R) value is an addition value of the pixel signal values of the left PD 40L and the right PD 40R.

Since the (L+R) value, that is, the addition value of the charges of the left PD 40L and the right PD 40R has a meaning as a pixel value of the PD division pixel 21, it is a signal used for image generation.

In addition, L reading is performed to obtain a signal value (L value) of the left PD 40L, and an R value which is a signal value of the right PD 40R is obtained by (L+R)−L. The phase difference of the pixel components subjected to the pupil division can be obtained by the "L value" "R value", and the AF control can be performed on the basis of the phase difference.

Here, since the (L+R) reading is to obtain a pixel value, the (L+R) reading is performed from all the PD division pixels 21 of image generation targets. Normally, for example, (L+R) reading is performed for the PD division pixels 21 of all horizontal lines as effective pixels. Note that the PD division pixels 21 of image generation targets may be some pixels after thinning, but in any case, (L+R) reading is performed for all the PD division pixels 21 necessary for image generation.

Meanwhile, in a case where the purpose of the L reading is the AF control, the L reading is not necessarily performed for all the pixels (that is, all the pixels as the image generation targets). When the L reading is performed for all the pixels, the reading processing is performed twice for all the horizontal lines including such pixels, and the reading time of 1V becomes long. For this reason, there is also a disadvantage in terms of the number of frames of continuous shooting imaging.

Therefore, it is conceivable that the L reading is performed on some thinned pixels. For example, for some horizontal lines, L reading and (L+R) reading are performed on the PD division pixels 21 of the horizontal lines, and only (L+R) reading is performed on the PD division pixels 21 of the other horizontal lines.

Figure 7:
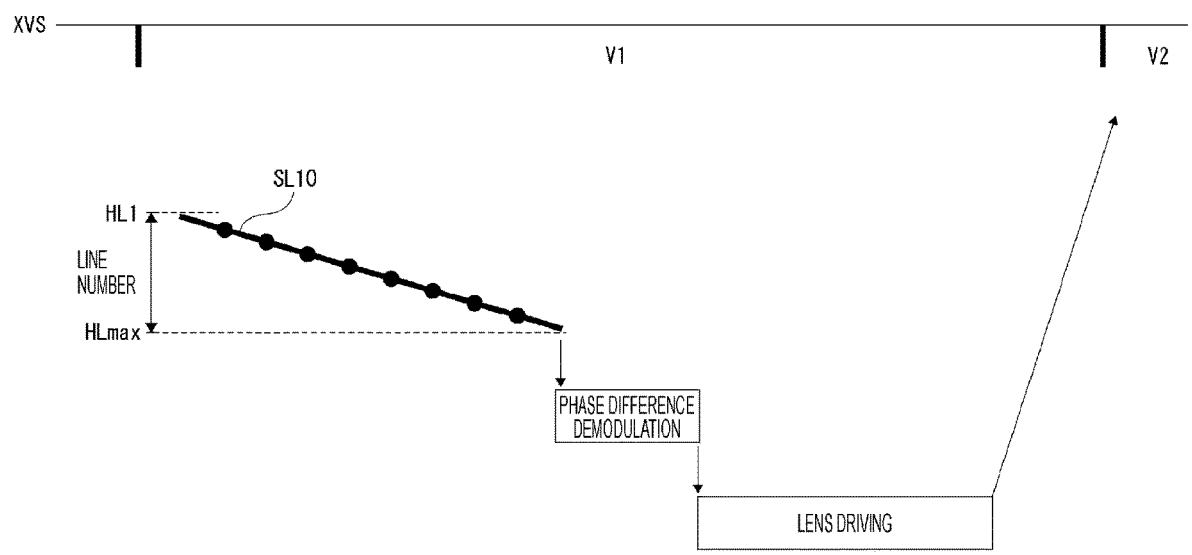
FIG. 7 is an explanatory diagram of a read operation of a comparative example.

FIG. 7 schematically illustrates such a read operation.

In FIG. 7, in the vertical period (V1, V2 . . . ) defined by the vertical synchronization signal XVS, the reading timing of each horizontal line when the vertical axis is the horizontal line number is illustrated as the straight line SL10. The first horizontal line number is "HL1", and the last horizontal line number is "HLmax".

For example, reading is sequentially performed from the first horizontal line (L1) to the last horizontal line (Lmax) in a 1V period (vertical period). Here, • is attached to the straight line SL10 at intervals of cycles of a plurality of horizontal lines. It is indicated that two rounds of reading are performed on the PD division pixels 21 of the horizontal lines of the portions where • is marked and normal reading is performed on the PD division pixels 21 of the horizontal lines corresponding to the solid line portion.

In this case, the normal reading means performing (L+R) reading once, and the two rounds of reading means performing L reading and (L+R) reading.

After the pixel reading is performed in this manner, AF demodulation is performed on the basis of the L value and the R value of the PD division pixel 21 subjected to the two rounds of reading, and lens driving is performed according to the result. As a result, for example, the AF control is reflected in the next vertical period.

Figure 8:
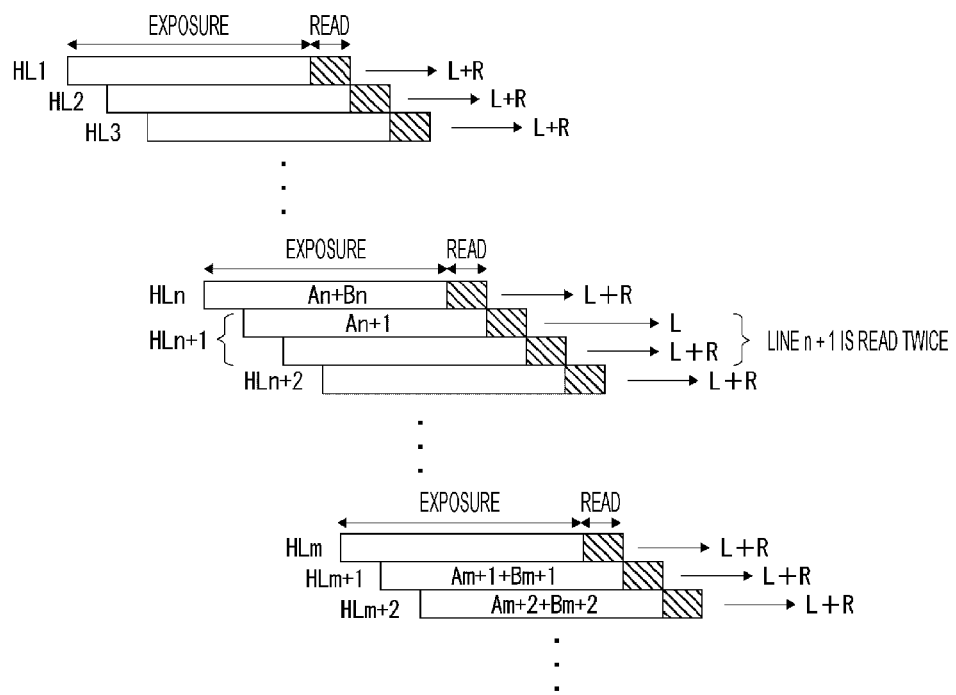
FIG. 8 is an explanatory diagram of a read operation of a comparative example.

FIG. 8 illustrates the exposure operation and the read operation (hatched portion) for some horizontal lines (horizontal lines HL1, HL2, HL3, . . . . HLn, HLn+1, HLn+2 . . . HLm, HLm+1, HLm+2) in the straight line SL10.

In each horizontal line, exposure is performed for a predetermined time, and then charge reading is performed.

Here, it is assumed that the horizontal line HLn+1 is a line marked with • in FIG. 7.

In FIG. 8, for each horizontal line other than the horizontal line HLn+1, only (L+R) reading is performed as normal reading.

In the horizontal line HLn+1, reading is performed twice as L reading and (L+R) reading.

By performing the two rounds of reading only for the partial horizontal line in this manner, the phase difference demodulation can be performed without lengthening the 1V period so much.

However, since there is a horizontal line that periodically performs the two rounds of reading as viewed in the vertical direction, a phenomenon occurs in which the edge of the moving subject appears unnatural on the image. This is because, in the example of FIG. 8, the portion of the horizontal line HLn+1 read twice and the portions before and after the portion (portions from the horizontal lines HL1 to HLn and portions after HLn+2) are shifted, and when the imager is read from the top to the bottom, such a shift is repeated a plurality of times, and thus the shift appears as a zigzag line.

Therefore, in the embodiment, the read operation is implemented such that such a periodic shift of the edge of the image does not occur.

<3. Read Operation of First Embodiment>

Figure 9:
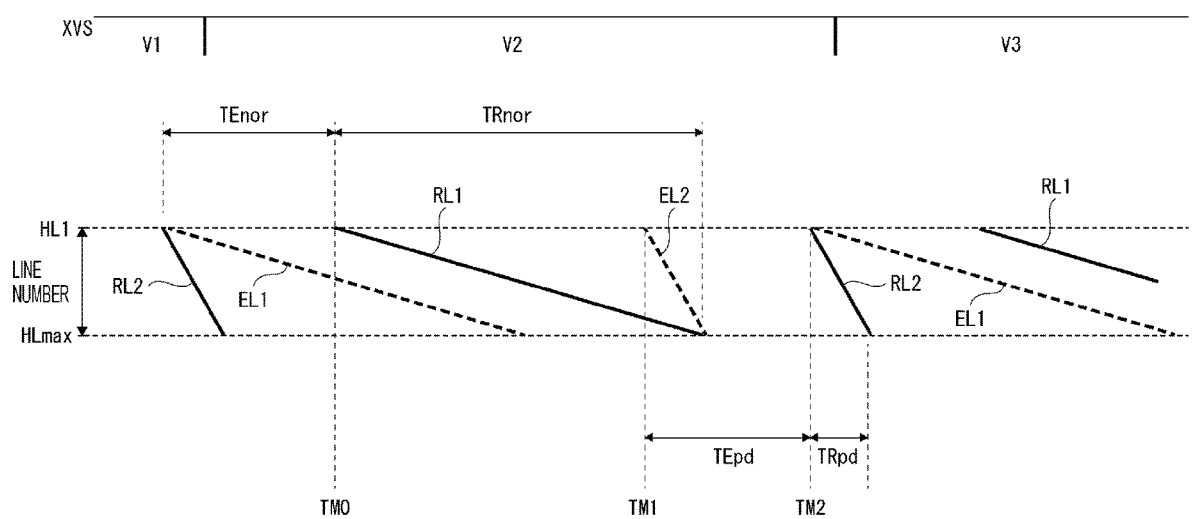
FIG. 9 is an explanatory diagram of a read operation according to a first embodiment.

A read operation as a first embodiment is schematically illustrated in FIG. 9. In FIG. 9, the horizontal direction is set as a time axis, and vertical periods V1, V2, and V3 defined by the vertical synchronization signal XVS are illustrated. The vertical periods V1, V2, V3, . . . assume, for example, a case where the release operation is performed in the continuous shooting mode and continuous shooting imaging is performed. One image constituting the continuous shot image is captured in each vertical period.

In addition, solid lines RL1 and RL2 and broken lines EL1 and EL2 are illustrated with the vertical axis as the horizontal line number ("HL1" to "HLmax"). Solid lines RL1 and RL2 indicate reading timings for the respective horizontal lines, and broken lines EL1 and EL2 indicate exposure start timings for the respective horizontal lines. In a case where a certain horizontal line is viewed, an interval between the broken line EL1 and the solid line RL1 and an interval between the broken line EL2 and the solid line RL2 are the exposure periods.

Description Will be Given Focusing on the Vertical Period V2.

Exposure is sequentially started from the first horizontal line (HL1) to the last horizontal line (HLmax) at timing indicated by the broken line EL1.

Thereafter, from the time point TM0, as indicated by the solid line RL1 parallel to the broken line EL1, reading is sequentially performed from the first horizontal line (HL1) to the last horizontal line (HLmax).

The fact that the broken line EL1 and the solid line RL1 are parallel means that exposure of a time length indicated as an exposure period TEnor is performed in each horizontal line from the head to the end, and then reading is performed.

Then, a period during which the read operation of the solid line RL1 is performed is a read period TRnor.

The read period TRnor is a period in which the first reading is executed. That is, (L+R) reading is performed once for each horizontal line.

Figure 10A:
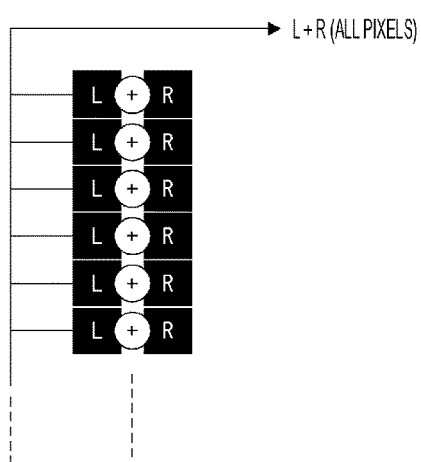
FIGS. 10A and 10B are schematic explanatory diagrams of a state of reading according to the embodiment.

FIG. 10A schematically illustrates the operation of the first reading. Charge reading of L value+R value is performed from each horizontal line.

At a certain time point TM1 in the middle of the read period TRnor in FIG. 9, exposure is started as indicated by the broken line EL2. This is exposure for subsequent second reading, and targets the PD division pixels 21 of some horizontal lines. For example, a horizontal line is periodically selected at a predetermined thinning rate such as 1 for 10 horizontal lines or the like, and the second reading is performed.

For example, if the horizontal lines HL1, HL11, HL21, . . . are selected, the exposure of the horizontal line HL1 is started at the time point TM1, and thereafter, the exposure is sequentially started at a timing indicated by the broken line EL2.

The reason why the inclination of the broken line EL2 is larger than that of the broken line EL1 is that the number of target horizontal lines is small.

Note that the thinning rate for selecting the horizontal lines HL to be subjected to the second reading may be changed. For example, it is conceivable to change the brightness according to the brightness.

Here, at the exposure start time point TM1 indicated by the broken line EL2, the read period TRnor is not finished, but the horizontal line to be exposed is set to a horizontal line for which the first reading has already been finished. For example, the time point TM1 at which the exposure of the broken line EL2 is started is set such that the exposure of the last horizontal line (HLmax) is started immediately after the first reading of the last horizontal line (HLmax) is finished.

At the timing indicated by the broken line EL2, the exposure is sequentially started in each horizontal line after the thinning.

Thereafter, from the time point TM2, as indicated by the solid line RL2 parallel to the broken line EL2, reading is sequentially performed for each exposed horizontal line.

The fact that the broken line EL2 and the solid line RL2 are parallel means that exposure of a time length indicated as an exposure period TEpd is performed in each horizontal line, and then reading is performed.

Then, a period during which the read operation of the solid line RL2 is performed is a read period TRpd.

The read period TRpd is a period in which the second reading is executed. That is, two rounds of reading of L reading and (L+R) reading are performed for each horizontal line.

Figure 10B:
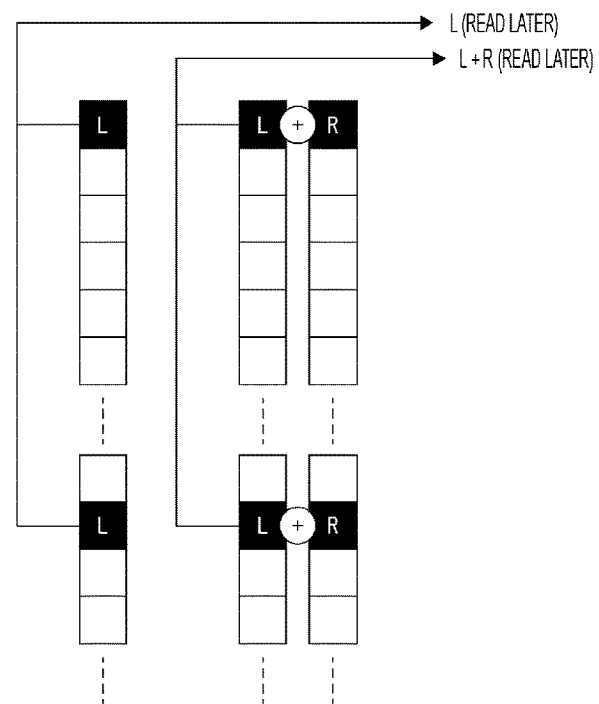

FIG. 10B schematically illustrates the operation of the second reading. L reading and (L+R) reading are performed from some horizontal lines selected as the lines after thinning.

In the reading, for example, after the L value is read from the left PD 40L, processing of reading the image signal of the right PD 40R is performed without resetting the charge. That is, after the L value is read, the (L+R) value is read by adding the L value and the R value in a floating diffusion (FD) unit in the imaging element.

Note that, after the second reading indicated by the solid line RL2 in FIG. 9 is started, the exposure for the first reading in the next vertical period V3 indicated by the broken line EL1 is started. This is because the exposure of the horizontal line on which the second reading is performed (and the thinned horizontal lines) can be started.

As illustrated in FIG. 9, in one vertical period corresponding to one frame, the first reading in which (L+R) reading is performed from all the PD division pixels 21 as image generation targets, and the second reading in which L reading and (L+R) reading are performed for some pixels after thinning are performed in a time division manner. In addition, the exposure period (broken line EL1) for the first reading and the exposure period (broken line EL2) for the second reading are provided separately.

In this case, in the first reading indicated by the solid line RL1, the two rounds of reading are not performed in some horizontal lines, so that the generation of an unnatural edge in the image as described in the comparative example of FIGS. 7 and 8 is eliminated. In addition, phase difference demodulation is performed on the basis of the second reading, and AF control can be performed.

Figure 11:
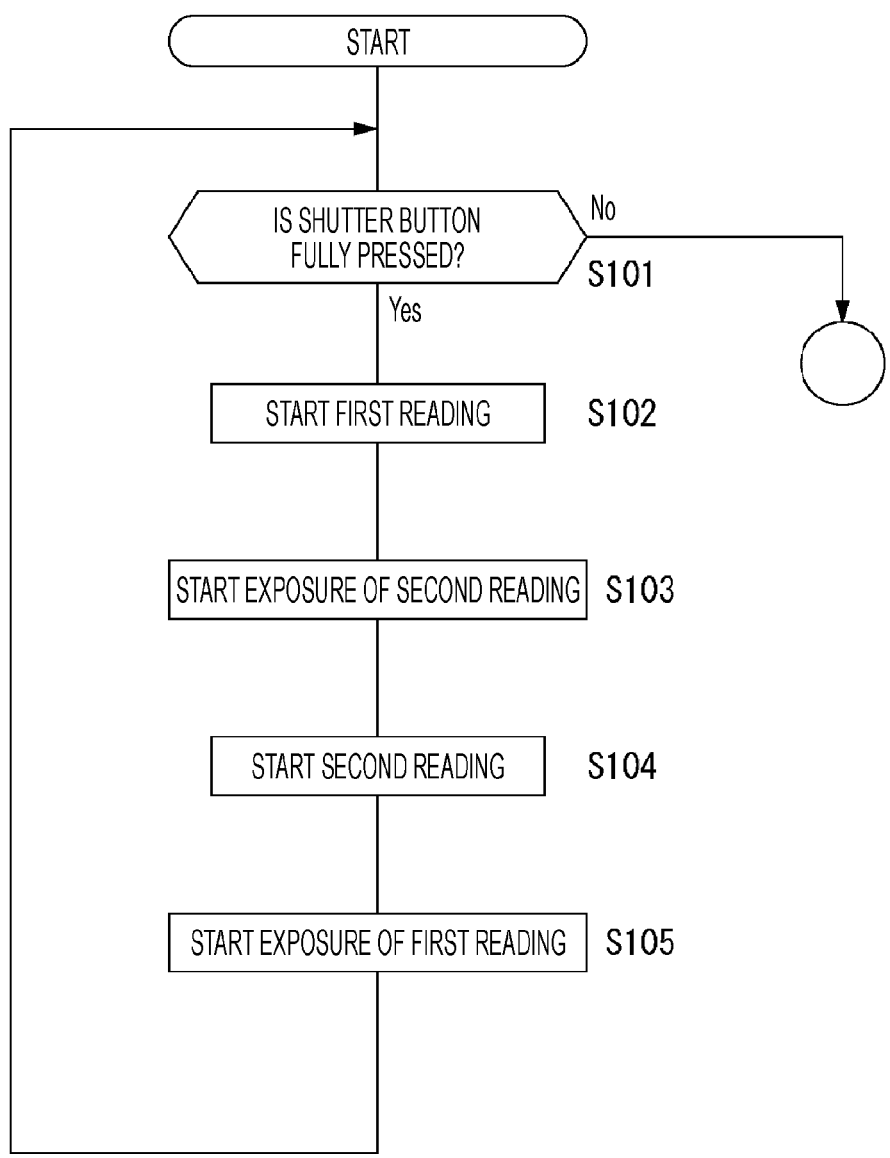
FIG. 11 is a flowchart of read operation control according to the first embodiment.
Figure 12:
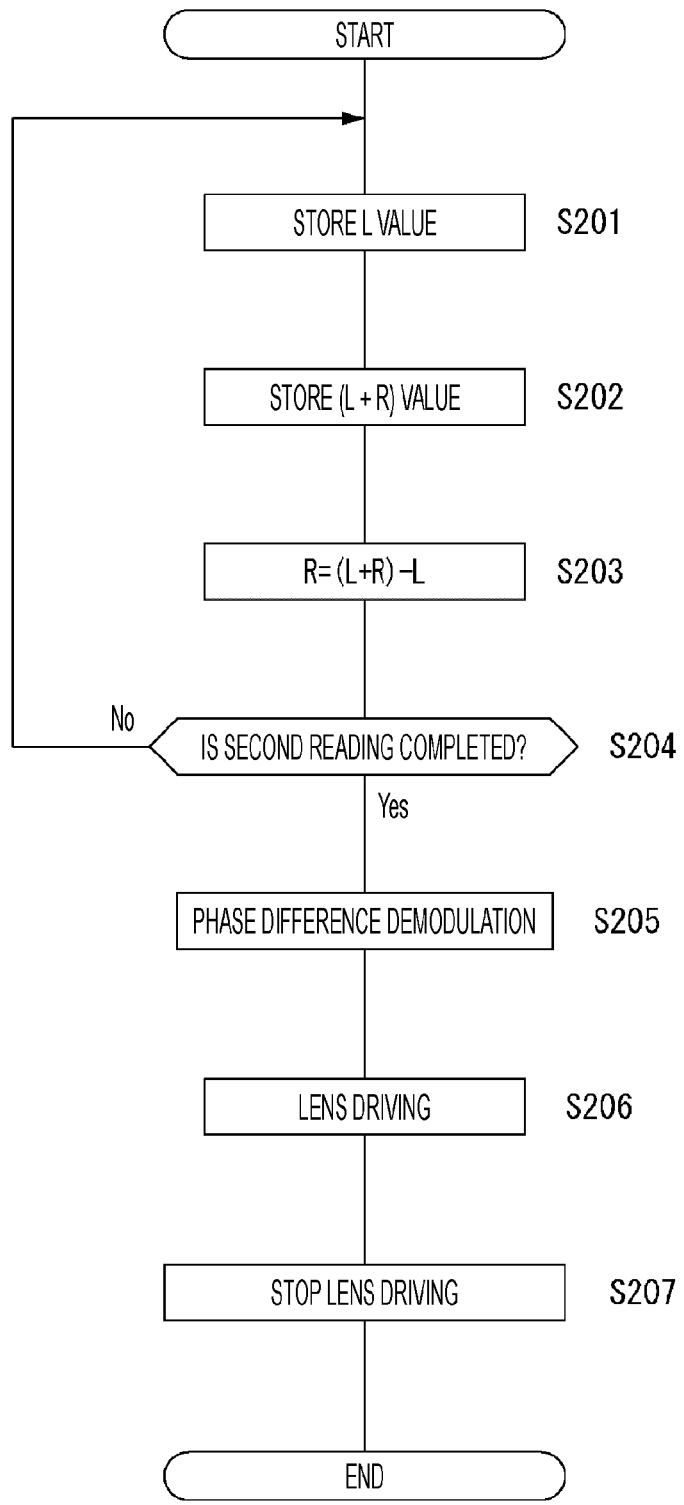
FIG. 12 is a flowchart of AF control according to the first embodiment.

The read operation as illustrated in FIG. 9 is executed on the basis of the control of the camera control unit 14. FIG. 11 illustrates a flowchart of the read operation based on the control of the camera control unit 14. In addition, AF processing accompanying the read operation is illustrated in FIG. 12. Note that these are examples assuming an imaging operation in a continuous shooting mode.

In step S101 of FIG. 11, the camera control unit 14 monitors the full press of the shutter button 6S. When the full press is not performed, other processing (not illustrated) is performed.

When the full press of the shutter button 6S is sensed in the continuous shooting mode, the camera control unit 14 proceeds from step S101 to step S102 and starts the first reading. In the imaging element 7, reading is sequentially started from the first horizontal line HL1.

The (L+R) value read from each PD division pixel 21 in the first reading is processed as a pixel value for generating an image in the camera signal processing unit 8, and one piece of still image data in continuous shooting is generated.

In practice, the pulse timing related to the read operation in the imaging element 7 is defined according to the parameter set by the camera control unit 14, and the first reading is started at a predetermined time point.

In this case, for example, the first reading is started from the time point TM0 in FIG. 9 at a timing starting from a vertical synchronization signal that defines a vertical period.

Note that, even before the shutter button 6S is fully pressed, exposure and reading are performed in each vertical period for displaying a live view image. For this reason, exposure is performed until reaching the time point TM0.

Subsequently, in step S103, the camera control unit 14 starts exposure for the second reading. In the imaging element 7, exposure is sequentially started only for the horizontal lines to be subjected to the second reading.

In practice, the pulse timing for executing the exposure operation is defined for each horizontal line in the imaging element 7 according to the parameter set by the camera control unit 14, and the exposure for the second reading is started from the time point TM1 in FIG. 9.

In step S104, the camera control unit 14 starts the second reading. In the imaging element 7, the second reading is sequentially performed only for the horizontal lines to be subjected to the second reading.

Also in this case, in practice, the pulse timing for executing the read operation is defined for each horizontal line in the imaging element 7 according to the parameter set by the camera control unit 14, and the second reading is executed as the operation after the time point TM2 in FIG. 9.

In step S105, the camera control unit 14 starts exposure for the first reading in the next vertical period. In the imaging element 7, exposure is sequentially started for all pixels (horizontal lines) as image generation targets.

In practice, the pulse timing for executing the exposure operation is defined for each horizontal line in the imaging element 7 according to the parameter set by the camera control unit 14. In this case, the exposure can be sequentially started from the first horizontal line HL1 immediately after the second reading is started. For example, in a case where the first horizontal line HL1 is a target of the second reading, exposure from the horizontal line HL1 becomes possible at the time point when the second reading of the PD division pixels 21 of the horizontal line HL1 is completed. In addition, in a case where the first horizontal line HL1 is not the target of the second reading, the exposure for the next first reading from the horizontal line HL1 becomes possible at the same time as the start of the second reading.

The pulse timing is determined in consideration of such circumstances.

Thereafter, the camera control unit 14 returns to step S101, and continues the similar processing when the shutter button 6S is fully pressed.

When the full press of the shutter button 6S is released, the camera control unit 14 exits the processing of FIG. 11. Note that even if the shutter button 6S is fully pressed, the processing is terminated when the maximum number of images to be captured in continuous shooting is exceeded.

In a period during which the continuous shooting imaging is performed in the processing of FIG. 11, the AF control is performed as illustrated in FIG. 12 corresponding to the second reading in step S104.

While each PD division pixel 21 is read twice as the second reading, steps S201, S202, and S203 are performed in the camera signal processing unit 8 corresponding to each PD division pixel 21.

That is, for one PD division pixel 21, the first L value as the second reading is stored in step S201, the second (L+R) value as the second reading is stored in step S202, and the R value is calculated and stored in step S203. The R value is obtained by R value=(L+R) value−L value.

This processing is repeated until the second reading is completed in step S204, that is, until the L value and the R value are obtained for all of the PD division pixels 21 to be subjected to the second reading.

Note that, in this example, for each PD division pixel 21 in the second reading, the L value is read at the first time, and the (L+R) value is read at the second time; however, the L value may be read at the first time, and the R value may be read at the second time (or read in the reverse order). That is, each divided PD may be read. In any case, it is only necessary to obtain the L value and the R value for each PD division pixel 21 to be subjected to the second reading.

When the L value and the R value are stored for each PD division pixel 21, the process proceeds to step S205, and the camera signal processing unit 8 performs the phase difference demodulation by the function of the phase difference demodulation unit 8a. Then, the defocus amount is transmitted to the camera control unit 14. The camera control unit 14 instructs the barrel control unit 18 in step S206 according to the defocus amount to drive the focus lens included in the optical system 16. Then, in step S207, the lens driving is stopped. Accordingly, the AF operation is executed.

<4. Read Operation of Second Embodiment>

Figure 13:
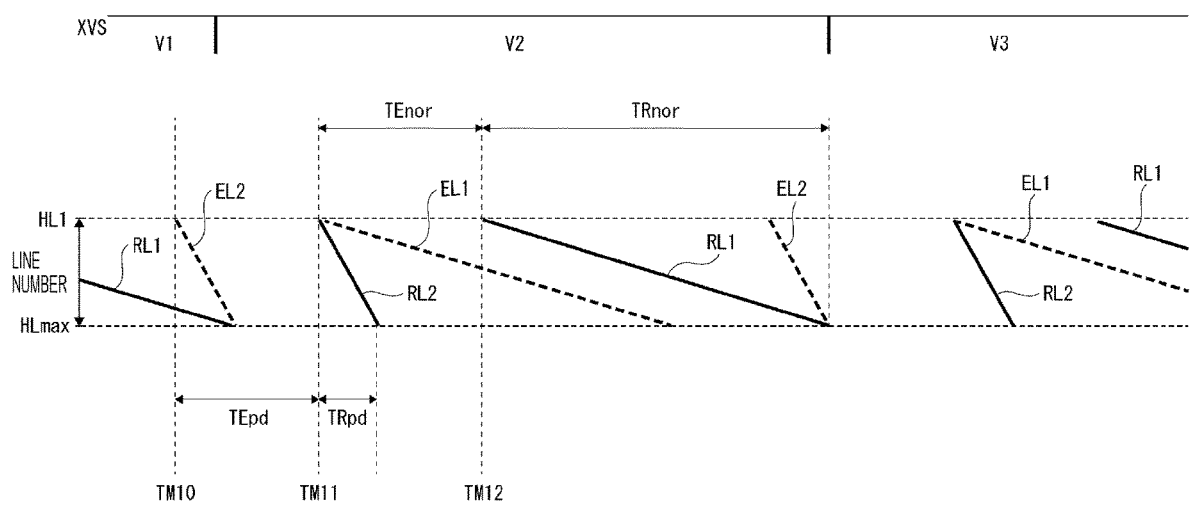
FIG. 13 is an explanatory diagram of a read operation according to a second embodiment.

A read operation as a second embodiment is illustrated in FIG. 13. Note that FIG. 13 and FIGS. 16, 20, and 21 to be described later illustrate vertical periods V1, V2, and V3 defined by the vertical synchronization signal XVS in a format similar to that of FIG. 9 on the assumption that the release operation is performed in the continuous shooting mode and the continuous shooting imaging is performed.

Furthermore, hereinafter, the meanings of the first reading and the second reading are similar to those of the first embodiment.

Description Will be Given Focusing on the Vertical Period V2.

At a time point TM10 in the middle of the first reading indicated by the solid line RL1 in the vertical period V1, exposure for the second reading indicated by the broken line EL2 is started.

Note that, at the exposure start time point TM10, the horizontal line to be exposed is a horizontal line for which the first reading has already been completed.

Exposure is sequentially started in each horizontal line after thinning at timing indicated by the broken line EL2, and then reading is sequentially performed in each exposed horizontal line from the time point TM11 as indicated by the solid line RL2 parallel to the broken line EL2.

The interval between the broken line EL2 and the solid line RL2 becomes the exposure period TEpd for the second reading. The period during which the read operation indicated by the solid line RL2 is performed is the read period TRpd of the second reading.

Exposure is sequentially started from the first horizontal line (HL1) to the last horizontal line (HLmax) at timing indicated by the broken line EL1.

Thereafter, from the time point TM12, as indicated by the solid line RL1 parallel to the broken line EL1, reading is sequentially performed from the first horizontal line (HL1) to the last horizontal line (HLmax).

The interval between the broken line EL1 and the solid line RL1 is the exposure period TEnor for the first reading.

The period during which the read operation with the solid line RL1 is performed is the read period TRnor of the first reading.

Note that exposure for the second reading in the next vertical period V3 is started in the middle of the read period TRnor.

As described above, in the example of FIG. 13, the second reading is performed first, and then the first reading is performed in one vertical period corresponding to one frame. Accordingly, in the first reading indicated by the solid line RL1, the two rounds of reading are not performed in some horizontal lines, so that the generation of an unnatural edge in the image as described in the comparative example of FIGS. 7 and 8 is eliminated. In addition, phase difference demodulation is performed on the basis of the second reading, and AF control can be performed.

<5. Read Operation of Third Embodiment>

As a third embodiment, an example in a case where the imaging element 7 is of a hybrid type including PD division pixels 21 and light shielding pixels 23 will be described.

Figure 14:
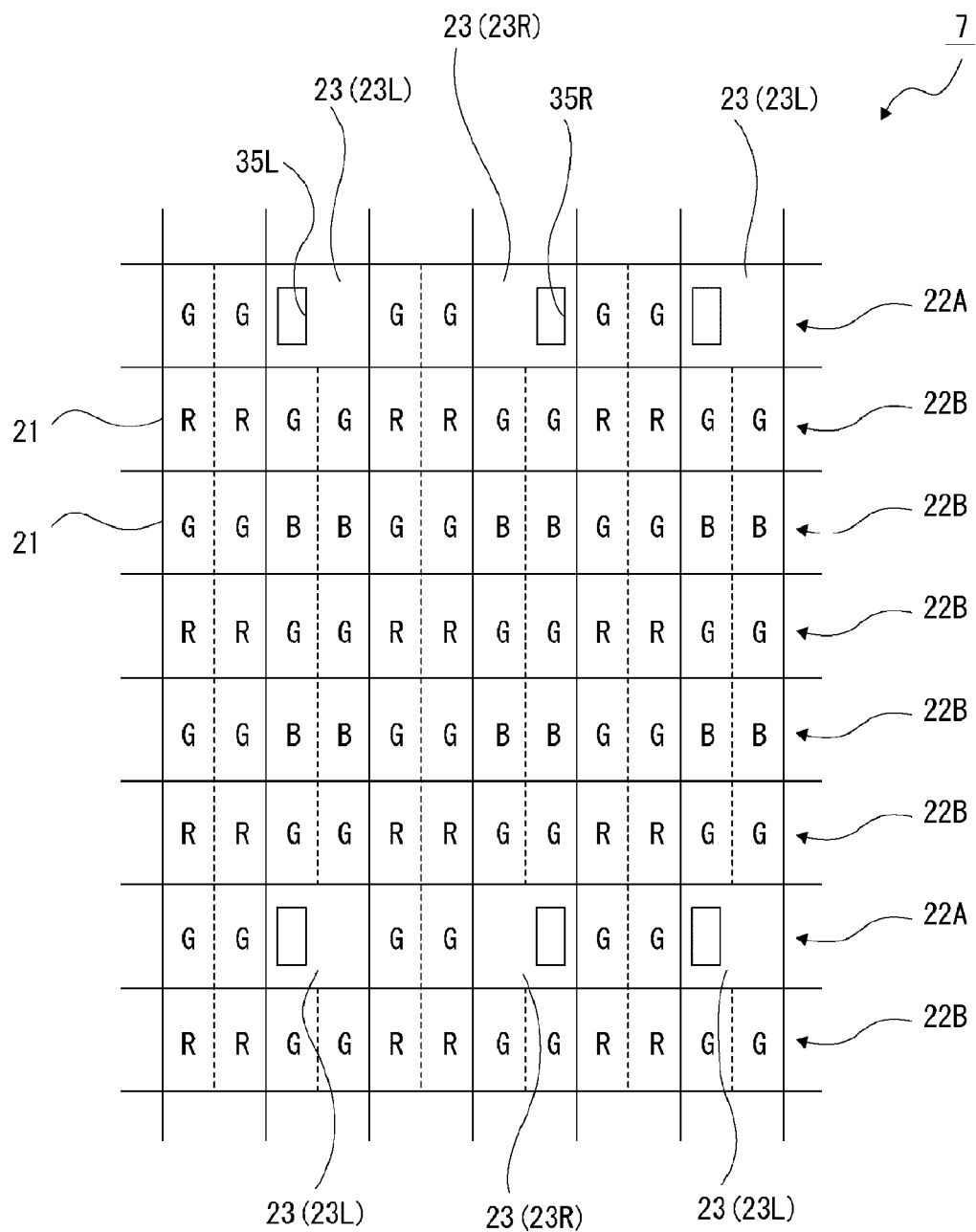
FIG. 14 is an explanatory diagram of an imaging element including light shielding pixels and PD division pixels according to the embodiment.

FIG. 14 illustrates a pixel arrangement example of the imaging element 7.

Pixel rows having light shielding pixels 23 are formed as first pixel rows 22A. The first pixel rows 22A are discretely disposed in the vertical direction, and a plurality of second pixel rows 22B is disposed between the first pixel rows 22A.

The first pixel rows 22A may be disposed regularly or irregularly. However, it is possible to suppress the design cost and the manufacturing cost related to the manufacturing of the imaging element 7 when the first pixel rows 22A are regularly disposed.

Each of the PD division pixels 21 included in the second pixel rows 22B is covered with a Bayer array color filter, and is one of one having red (R) spectral sensitivity, one having green (G) spectral sensitivity, or one having blue (B) spectral sensitivity depending on the type of the color filter.

The configuration of the light shielding pixel 23 will be described with reference to the schematic diagram of FIG. 15.

The light shielding pixel 23 includes a PD 30, a light shielding portion 31 disposed in front of the PD 30 (subject side), an inner lens 32 disposed in front of the light shielding portion 31, a color filter (cyan) 33 disposed in front of the inner lens 32, and an on-chip microlens 34 disposed in front of the color filter 33.

Note that the inner lens 32 and the color filter 33 may not be provided in the light shielding pixel 23.

The PD 30 is a light receiving element on which a part of the light having passed through the exit pupil EP is incident, but can receive light only in a partial region in the light receiving region of the PD 30 by the light shielding portion 31 disposed in front.

That is, the light shielding portion 31 is formed to cover the left half region of the PD 30. A right opening 35R is formed in the light shielding portion 31.

The inner lens 32 and the on-chip microlens 34 are optical components provided to efficiently condense light, which passes through the exit pupil EP and enters one pixel, on the PD 30.

The color filter 33 is, for example, a filter having cyan (Cy) spectral sensitivity.

Figure 15:
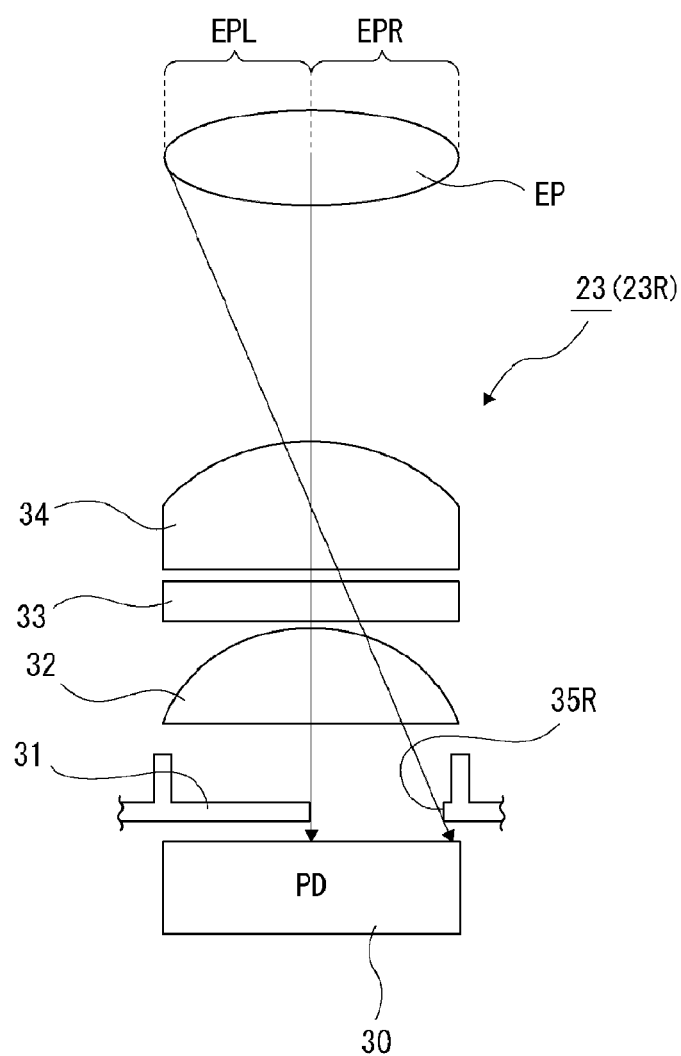
FIG. 15 is an explanatory diagram of a configuration example of light shielding pixels disposed in an on-axis region.

As illustrated in FIG. 15, the PD 30 is configured to receive only light passing through the left region (left pupil region) which is the left half region of the exit pupil EP. That is, the light passing through the right region (right pupil region) which is the right half region of the exit pupil EP is shielded by the light shielding portion 31 and does not reach the PD 30. Therefore, the pupil division function is implemented.

The light shielding pixel 23 configured to receive light passing through the left pupil region as illustrated in FIG. 15 is referred to as a light shielding pixel 23R because it receives light in a region deviated to the right on the light receiving surface. That is, in the light shielding pixel 23R, the right opening 35R is formed.

Furthermore, a light shielding pixel 23L having a mirror-symmetrical configuration with respect to the configuration illustrated in FIG. 15 is a light shielding pixel 23 configured to receive light passing through the right pupil region, and this pixel receives light in a region deviated to the left side on the light receiving surface. As illustrated in FIG. 14, a left opening 35L is formed in the light shielding portion 31 included in the light shielding pixel 23L.

As illustrated in FIG. 14, the distance between the light shielding pixel 23R and the light shielding pixel 23L is, for example, a distance corresponding to two pixels, and the light shielding pixel 23R and the light shielding pixel 23L are alternately disposed.

The signal output from the light shielding pixel 23R and the signal output from the light shielding pixel 23L are handled as a pair of phase difference signals by the camera signal processing unit 8 (or the camera control unit 14). That is, the phase difference demodulation unit 8a of the camera signal processing unit 8 can calculate the defocus amount using the phase difference between the signal output from the light shielding pixel 23R and the signal output from the light shielding pixel 23L.

Figure 16:
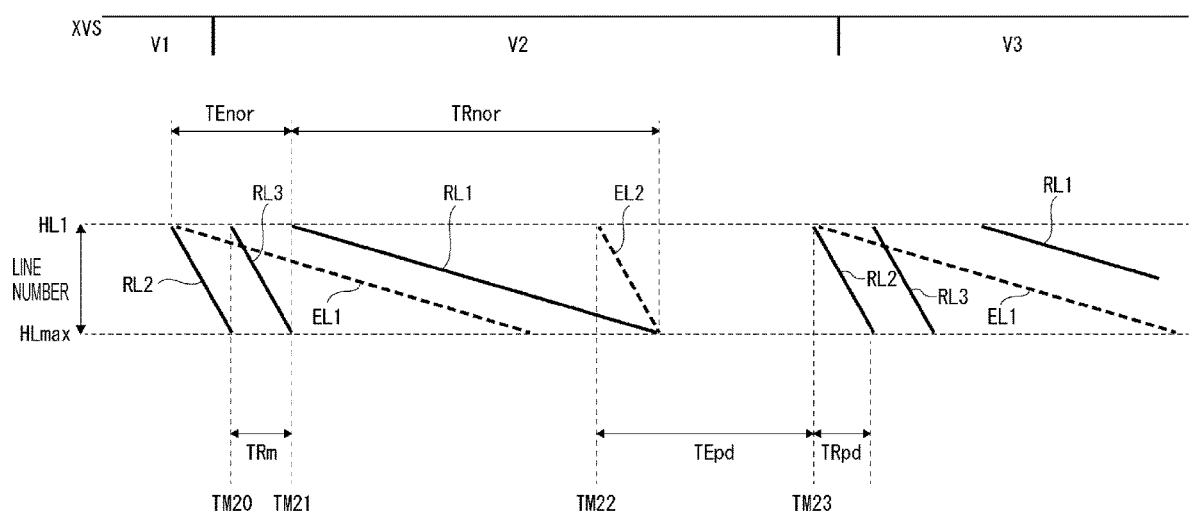
FIG. 16 is an explanatory diagram of a read operation according to a third embodiment.

FIG. 16 illustrates a read operation example in a case where such an imaging element 7 is assumed. Description Will be Given Focusing on the Vertical Period V2.

Exposure is sequentially started from the first horizontal line (HL1) to the last horizontal line (HLmax) at timing indicated by the broken line EL1.

Thereafter, reading is sequentially performed from the time point TM20 for the first pixel row 22A as indicated by the solid line RL3 (read period TRm). This is to read the values of the light shielding pixels 23L and 23R, and is referred to as third reading to be distinguished from the first reading and the second reading.

In addition, from the time point TM21, as indicated by the solid line RL1 parallel to the broken line EL1, reading is sequentially performed from the first horizontal line (HL1) to the last horizontal line (HLmax). This is first reading (see FIG. 10A).

Note that, since the first reading is performed on all the horizontal lines, the reading is performed on both the first pixel row 22A including the light shielding pixels 23 and the second pixel row 22B. Each pixel value by the first reading is used for image generation, but the light shielding pixel 23 is treated as an invalid pixel, and for example, a pixel value of 1 of the light shielding pixel 23 is formed by interpolation processing.

At a certain time point TM22 in the middle of the read period TRnor, exposure for the second reading is started as indicated by the broken line EL2.

Thereafter, from the time point TM23, as indicated by the solid line RL2 parallel to the broken line EL2, reading is sequentially performed for each exposed horizontal line (second reading: see FIG. 10B).

Note that, after the second reading indicated by the solid line RL2 is started, exposure for the first reading in the next vertical period V3 indicated by the broken line EL1 is started. In the case of FIG. 16, the exposure of the broken line EL1 also serves as the exposure of the light shielding pixel 23 for the third reading.

As illustrated in FIG. 16, in one vertical period corresponding to one frame, the first reading in which (L+R) reading is performed from all the PD division pixels 21 as image generation targets, the second reading in which L reading and (L+R) reading are performed for some pixels after thinning, and the third reading for the light shielding pixels 23 are performed in a time division manner. In addition, the exposure period (broken line EL1) for the first reading and the third reading and the exposure period (broken line EL2) for the second reading are provided separately.

Also in this case, in the first reading indicated by the solid line RL1, the two rounds of reading are not performed in some horizontal lines, so that the generation of an unnatural edge in the image is eliminated. In addition, phase difference demodulation is performed on the basis of the second reading and the third reading, and AF control can be performed.

Figure 17:
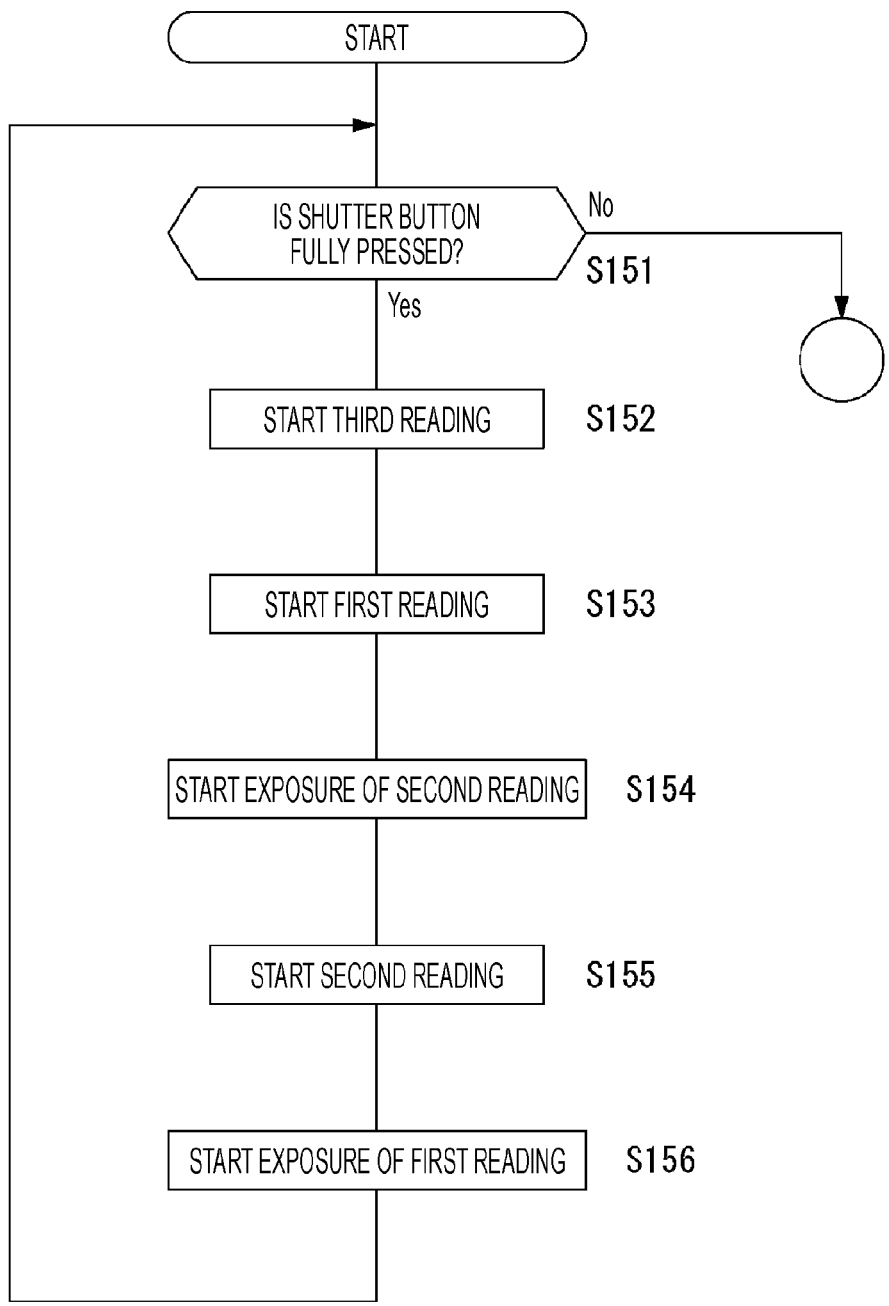
FIG. 17 is a flowchart of read operation control according to the third embodiment.
Figure 18:
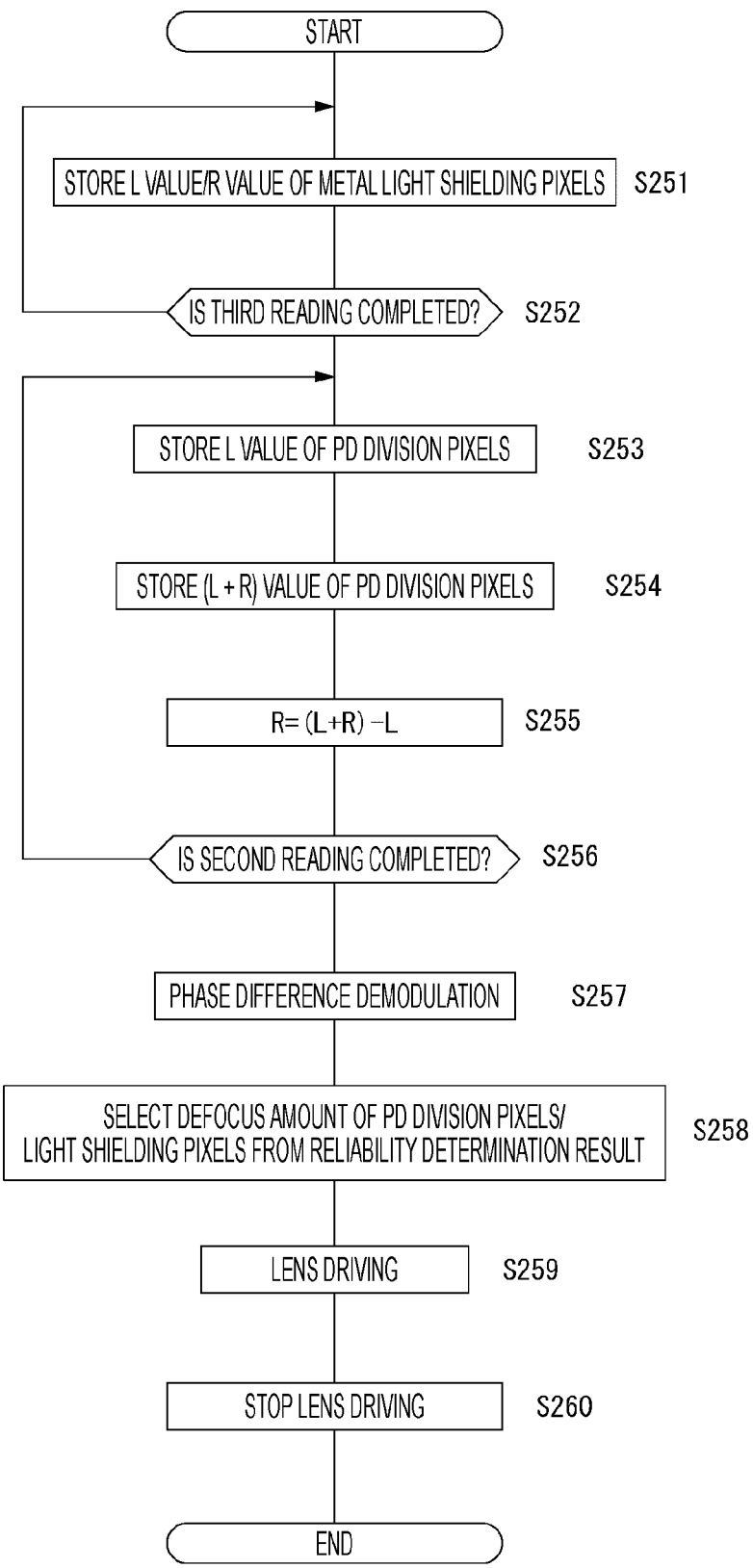
FIG. 18 is a flowchart of AF control according to the third embodiment.

The read operation as illustrated in FIG. 16 is executed on the basis of the control of the camera control unit 14. FIG. 17 illustrates a flowchart of the read operation based on the control of the camera control unit 14. In addition, AF processing accompanying the read operation is illustrated in FIG. 18. An imaging operation in the continuous shooting mode is assumed.

In step S151 of FIG. 17, the camera control unit 14 monitors the full press of the shutter button 6S. When the full press is not performed, other processing (not illustrated) is performed.

When the full press of the shutter button 6S is sensed in the continuous shooting mode, the camera control unit 14 proceeds from step S151 to step S152 and starts the third reading. In the imaging element 7, reading is sequentially started for the first pixel row 22A.

In this case, for example, the third reading is started from the time point TM20 in FIG. 16 at a timing starting from a vertical synchronization signal that defines a vertical period.

The value read from each light shielding pixel 23 in the third reading is used for phase difference demodulation in the camera signal processing unit 8.

In step S153, the camera control unit 14 starts the first reading from the time point TM21 in FIG. 16. In the imaging element 7, reading is sequentially started from the first horizontal line HL1.

The (L+R) value read from each PD division pixel 21 in the first reading is processed as a pixel value for generating an image in the camera signal processing unit 8, and one piece of still image data in continuous shooting is generated.

Subsequently, in step S154, the camera control unit 14 starts exposure for the second reading from the time point TM22. In the imaging element 7, exposure is sequentially started only for the horizontal lines to be subjected to the second reading.

In step S155, the camera control unit 14 starts the second reading from the time point TM23. In the imaging element 7, the second reading is sequentially performed only for the horizontal lines to be subjected to the second reading.

In the second reading, for each PD division pixel 21, the L value is read at the first time, and the (L+R) value is read at the second time. Note that, also in this case, in the second reading, the L value may be read at the first time, and the R value may be read at the second time (or read in the reverse order).

In step S156, the camera control unit 14 starts exposure for the first reading and the third reading in the next vertical period. In the imaging element 7, exposure is sequentially started for all pixels (horizontal lines) as image generation targets.

Thereafter, the camera control unit 14 returns to step S151, and continues the similar processing when the shutter button 6S is fully pressed.

When the full press of the shutter button 6S is released, the camera control unit 14 exits the processing of FIG. 17. Note that even if the shutter button 6S is fully pressed, the processing is also terminated when the maximum number of images to be captured in continuous shooting is exceeded.

In a period during which continuous shooting imaging is performed in the above processing of FIG. 17, the AF control is performed as illustrated in FIG. 18 corresponding to the third reading in step S152 and the second reading in step S155.

While the third reading is being performed, the camera signal processing unit 8 performs the processing of step S251 corresponding to each light shielding pixel 23. That is, the L value and the R value of the light shielding pixel 23 are stored. This is a value read from the pair of light shielding pixels 23L and 23R.

When the third reading is completed and the L values and R values of all the target light shielding pixels 23L and 23R are stored, the camera signal processing unit 8 then performs the processing of steps S253, S254, and S255 for each of the PD division pixels 21 during the second reading.

That is, for one PD division pixel 21, the first L value as the second reading is stored in step S253, the second (L+R) value as the second reading is stored in step S254, and the R value is calculated and stored in step S255. The R value is obtained by R value=(L+R) value-L value.

This processing is repeated until the second reading is completed in step S256, that is, until the L value and the R value are obtained for all of the PD division pixels 21 to be subjected to the second reading.

When the L value and the R value are stored for each PD division pixel 21, the process proceeds to step S258, and the camera signal processing unit 8 performs the phase difference demodulation and the defocus amount calculation by the function of the phase difference demodulation unit 8a. In this case, the phase difference demodulation can be performed from the output of the light shielding pixels 23 or from the output of the PD division pixels 21. The defocus amount based on each phase difference demodulation is transmitted from the camera signal processing unit 8 to the camera control unit 14.

In step S258, the camera control unit 14 determines which one has higher reliability at present, and selects the defocus amount based on either the light shielding pixels 23 or the PD division pixels 21 accordingly. Then, the camera control unit 14 instructs the barrel control unit 18 in step S259 according to the defocus amount to drive the focus lens included in the optical system 16. Then, in step S260, the lens driving is stopped. Accordingly, the AF operation is executed.

Here, the light shielding pixels 23 and the PD division pixels 21 have the following differences.

The light shielding pixels 23 are pixels used only for phase difference demodulation. Meanwhile, the PD division pixels 21 can be used as normal pixels (pixels for image generation) while being used for phase difference demodulation. For this reason, the light shielding pixels 23 are discretely disposed, and the number of pixels cannot be much increased.

Therefore, the PD division pixels 21 are superior to the light shielding pixels 23 in terms of low illuminance performance and large F-number performance.

Meanwhile, the light shielding pixels 23 have pupil correction design flexibility, and are superior to the PD division pixels 21 in that off-axis performance is excellent.

In view of this, it is considered that the advantages of the PD division pixels 21 can be utilized under a low illuminance environment, and the advantages of the light shielding pixels 23 can be utilized under a high illuminance environment.

Therefore, in step S258, it is conceivable to perform the reliability determination on the basis of the illuminance environment. Specifically, any phase difference signal is selected according to the exposure amount.

Figure 19:
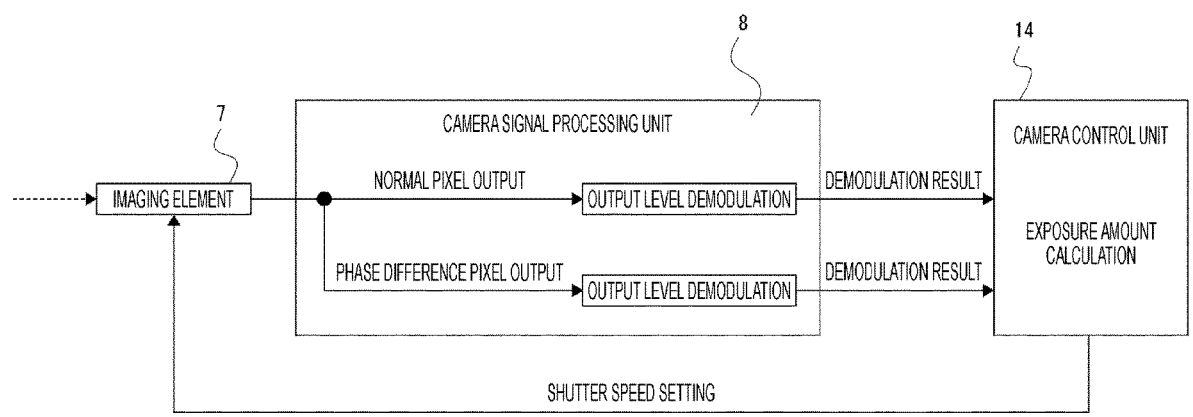
FIG. 19 is a block diagram of a configuration related to calculation of an exposure amount according to the embodiment.

The calculation of the exposure amount will be described with reference to FIG. 19.

The imaging element 7 outputs a normal pixel output for generating a normal image signal and a phase difference pixel output as a phase difference signal for AF control. Here, the normal pixel output is the (L+R) value from the PD division pixel 21 by the first reading.

The normal pixel output and the phase difference pixel output are input to an output level demodulation circuit included in the camera signal processing unit 8. The output level demodulation circuit calculates an output average value in the exposure calculation target region on the pixel on the basis of the input normal pixel output and phase difference pixel output, and each output average value is output from the camera signal processing unit 8 and input to the camera control unit 14.

The camera control unit 14 calculates an exposure amount according to the demodulation result output from the camera signal processing unit 8, and determines a shutter speed (or a parameter capable of adjusting an exposure amount such as an F value, a gain, or the like). The camera control unit 14 performs processing of setting the determined shutter speed in the imaging element 7.

The exposure amount calculation performed by the camera control unit 14 may be performed on the basis of only the normal pixel output or may be performed on the basis of only the phase difference pixel output. Furthermore, the processing may be performed on the basis of both the normal pixel output and the phase difference pixel output.

In any case, the illuminance environment can be determined by the exposure amount calculation, and on the basis of this, regarding the AF control, the phase difference demodulation result by the light shielding pixel 23 can be used, or the phase difference demodulation result by the PD division pixel 21 can be selected.

<6. Read Operation of Fourth Embodiment>

Figure 20:
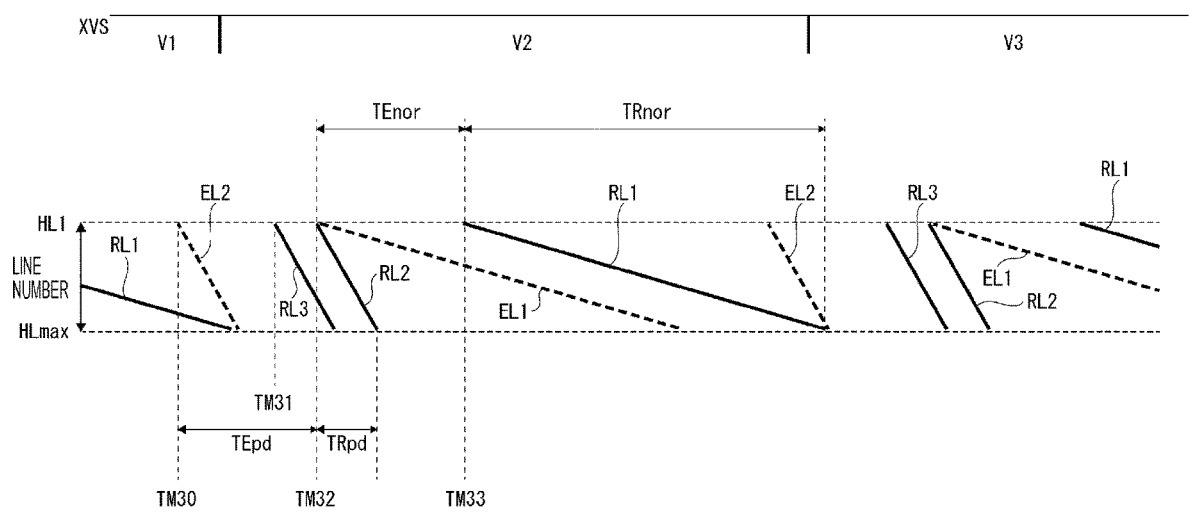
FIG. 20 is an explanatory diagram of a read operation according to a fourth embodiment.

A read operation as a fourth embodiment is illustrated in FIG. 20.

At a time point TM30 in the middle of the first reading indicated by the solid line RL1 in the vertical period V1, exposure for the second reading indicated by the broken line EL2 is started.

The third reading for the light shielding pixels 23 is started at the timing indicated by the solid line RL3 from the time point TM31. Reading of the light shielding pixels 23 for each first pixel row 22A is sequentially performed.

From the time point TM32, the second reading is performed as indicated by the solid line RL2.

In addition, after the start of the second reading, the exposure is sequentially started from the first horizontal line (HL1) to the last horizontal line (HLmax) at timing indicated by the broken line EL1.

Thereafter, from the time point TM33, as indicated by the solid line RL1 parallel to the broken line EL1, reading is sequentially performed from the first horizontal line (HL1) to the last horizontal line (HLmax).

Note that exposure for the second reading and the third reading in the next vertical period V3 is started in the middle of the read period TRnor.

As described above, in the example of FIG. 20, the third reading, the second reading, and the first reading are performed in this order in one vertical period corresponding to one frame. This also eliminates the generation of an unnatural edge in the image by the first reading indicated by the solid line RL1. In addition, phase difference demodulation is performed on the basis of the third reading or the second reading, and AF control can be performed.

<7. Read Operation of Fifth Embodiment>

Figure 21:
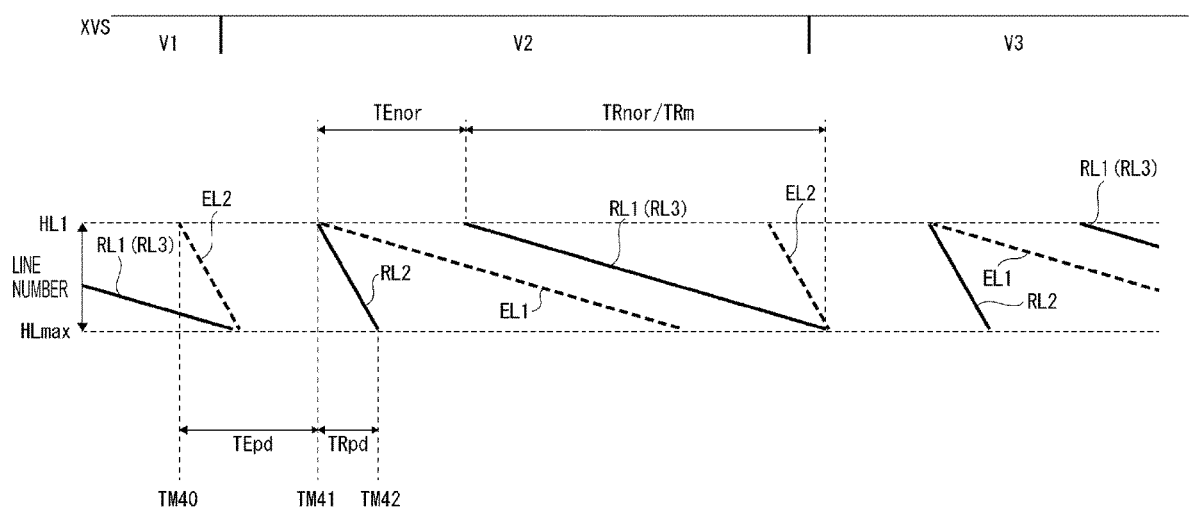
FIG. 21 is an explanatory diagram of a read operation according to a fifth embodiment.

A read operation as a fifth embodiment is illustrated in FIG. 21.

This is an example in which the first reading and the third reading are simultaneously performed.

At a time point TM40 in the middle of the first reading (and third reading) indicated by the solid line RL1 (RL3) in the vertical period V1, exposure for the second reading indicated by the broken line EL2 is started.

From the time point TM41, the second reading is performed as indicated by the solid line RL2.

In addition, after the start of the second reading, the exposure is sequentially started from the first horizontal line (HL1) to the last horizontal line (HLmax) at timing indicated by the broken line EL1.

Thereafter, from the time point TM42, as indicated by the solid line RL1 (RL3) parallel to the broken line EL1, reading is sequentially performed from the first horizontal line (HL1) to the last horizontal line (HLmax). In this case, the (L+R) value is read from the PD division pixel 21, and the light shielding pixel 23 is also read in the process.

As described above, in the example of FIG. 21, the second reading, the first reading, and the third reading are performed in this order in one vertical period corresponding to one frame. This also eliminates the generation of an unnatural edge in the image by the first reading indicated by the solid line RL1. Since the third reading is performed in the process of the first reading and the two rounds of reading do not occur, there is no problem even if the first reading and the third reading are performed simultaneously. In addition, phase difference demodulation is performed on the basis of the third reading or the second reading, and AF control can be performed.

<8. Conclusion and Modifications>

In the above embodiments, the following effects can be obtained.

The imaging device 1 according to the embodiments includes the imaging element 7 including the PD division pixels 21, and the camera control unit 14. The camera control unit 14 performs control such that, in a case of performing rolling shutter reading from the imaging element 7, the first reading and the second reading are performed in a time division manner as reading corresponding to one frame (one vertical period) of the image, and an exposure period for the first reading and an exposure period for the second reading are provided separately. The first reading is to read the (L+R) value that is the addition value of the left PD 40L (first pixel) and the right PD 40R (second pixel) constituting the PD division pixel 21 for all the pixels as image generation targets, and the second reading is to obtain the values of the left PD 40L (first pixel) and the right PD 40R (second pixel) for some pixels of the pixels as image generation targets.

Therefore, it is possible to prevent influence of left-right non-addition reading for phase difference demodulation at the time of reading all pixels as image generation targets. That is, in the reading of all the pixels as image generation targets, an operation of reading one horizontal line twice can be avoided. This prevents generation of an image in which an edge of a moving subject is shifted in a case where rolling shutter reading is performed.

Note that "all pixels as image generation targets" to be subjected to the first reading does not refer to all pixels of the imaging element 7. For example, in a case where dummy pixels are provided, the dummy pixels are excluded. In addition, it does not always refer to all effective pixels. In a case where reading of pixels which are thinned out among all the effective pixels is performed as reading for forming an image at the time of imaging, it means all the pixels after thinning subjected to reading. For example, in a case where a low resolution mode is selected for a still image, or in a case where a moving image is captured or a still image is continuously captured, pixels forming one frame of image may be thinned out. In these cases, "all pixels as image generation targets" refers to all pixels to be read after thinning.

In the first to fifth embodiments, the processing of generating the image is performed on the basis of the addition value obtained by the first reading, and the phase difference demodulation processing is performed using the value of the left PD 40L and the value of the right PD 40R obtained by the second reading.

Since the PD division pixels 21 are effective pixels for image generation and are pixels for defocus amount calculation by phase difference demodulation, it is usually assumed that reading is performed at a time. In this case, in a case of rolling shutter reading, an unnatural line (zigzag-shaped line) is seen at an edge of a moving subject by performing two rounds of reading as reading of the left PD 40L and addition reading of the left PD 40L and the right PD 40R for one horizontal line. In the case of the processing of the embodiments, the first reading and the second reading are performed in a time division manner, so that it is possible to prevent the occurrence of the two rounds of reading of one horizontal line in the first reading related to image generation. As a result, an unnatural edge can be prevented from being generated in the image, and the image quality can be improved.

In addition, the exposure periods are separately provided for the first reading and the second reading, which means that the (L+R) value and the L value by the exposure before the second reading are used instead of using the (L+R) value by the first reading. That is, the values of the left PD 40L and the right PD 40 are obtained as the same exposure opportunity value. As a result, the defocus amount can be correctly obtained, and highly accurate phase difference information can be obtained even if reading is performed in a time division manner, and AF performance can be maintained, for example.

In the first and third embodiments, as reading corresponding to one frame of an image, the second reading is executed after the first reading is completed.

That is, first, reading for image generation is performed in the first reading, and subsequently, the second reading is performed for focus control in a subsequent frame.

Although the order of the first reading and the second reading is not limited, it is advantageous in that imaging with a reduced time lag from the release operation is implemented by performing the first reading first, for example.

In the second, fourth, and fifth embodiments, as reading corresponding to one frame of an image, the first reading is executed after the second reading is completed.

For example, first, the second reading is performed for focus control in a subsequent frame, and subsequently, the second reading for image generation is performed.

By performing the second reading first within one vertical period, for example, the possibility of enabling AF control according to defocus in the next frame can be increased, which is advantageous for improving AF responsiveness.

In this case, in the case of considering continuous shooting imaging, the time lag from the release operation becomes large, but for example, in the case of moving image imaging, this hardly causes a problem.

In the first to fifth embodiments, the exposure for the second reading is started before the first reading is completed.

Even in the middle of the first reading, the exposure for the second reading is started since the line for which the reading has been completed can be exposed.

As a result, it is possible to shorten the period required for the proceeding operation of the first reading, the exposure for the second reading, and the second reading. In other words, it is advantageous to shorten one vertical period at the time of continuous shooting or the like.

In particular, in the case of continuous shooting imaging, it is preferable since shortening the time of one frame (one vertical period) as much as possible is desired.

Note that the exposure for the second reading may be started after the first reading is completed.

In the first to fifth embodiments, the second reading is completed during the exposure for the first reading.

That is, the second reading is performed in parallel with the exposure for the first reading, and is completed during the period of the exposure for the first reading.

As a result, it is possible to shorten the period required for the proceeding operation of the second reading, the exposure for the first reading, and the first reading. For example, the first reading can be started when the second reading is completed. This is also advantageous for shortening one vertical period at the time of continuous shooting or the like.

Note that the exposure for the first reading may be started after the second reading is completed.

In the first to fifth embodiments, reading of the value of the left PD 40L and reading of the addition value of the left PD 40L and the right PD 40R are performed in the second reading.

For each horizontal line, the value of the left PD 40L and the value of the right PD 40R for calculating the defocus amount are obtained by performing two rounds of reading as, for example, reading of the left PD 40L and addition reading of the left PD 40L and the right PD 40R. Since the value obtained by the second reading is not used for image generation, such two rounds of reading do not affect the image.

Note that, in the second reading, reading of the value of the right PD 40R and reading of the addition value of the left PD 40L and the right PD 40R may be performed.

In addition, in the second reading, for example, the reading of the left PD 40L and the reading of the right PD 40R may be performed as two rounds of reading, or the reading of the left PD 40L and the reading of the right PD 40R may be performed simultaneously and independently.

In the third, fourth, and fifth embodiments, the imaging element 7 includes the light shielding pixel 23 having the pupil division function by including the light shielding portion that shields one of the pair of light fluxes having passed through the pair of partial regions deviated in opposite directions to each other in a predetermined direction in the exit pupil and the light receiving element that receives the other light flux, and the camera control unit 14 performs control such that the third reading of reading the light shielding pixel 23 is performed, and the phase difference demodulation processing is performed using the value of the light shielding pixel 23 obtained by the third reading.

By using the imaging element 7 including the PD division pixels 21 and the light shielding pixels 23, it is possible to perform phase difference demodulation based on the PD division pixel 21 and phase difference demodulation based on the light shielding pixel 23, and for example, it can be selectively used according to the situation.

In the third embodiment, as reading corresponding to one frame of an image, an example has been described in which the third reading is performed before the second reading.

In addition, in the fourth and fifth embodiments, as reading corresponding to one frame of an image, an example has been described in which the second reading is performed before the third reading.

Before and after the second reading and the third reading are not limited, but by performing the third reading first, for example, in a situation where the degree of reliability of the defocus amount based on the light shielding pixels is high or the like, the AF control can be executed on the basis of the third reading, and the responsiveness can be improved.

Conversely, by performing the second reading first, in a situation where the degree of reliability of the defocus amount based on the PD division pixels is high or the like, the AF control can be executed on the basis of the second reading, and the responsiveness can be improved.

In this sense, which one is read first may be switched according to a situation such as brightness or the like, for example.

The fifth embodiment is an example in which the third reading is performed together with the first reading.

This eliminates the need to execute the third reading as a period different from the first reading, which is advantageous for shortening one vertical period.

In the third embodiment, it has been described that focus control is performed using the result of the phase difference demodulation processing based on the second reading or the result of the phase difference demodulation processing based on the third reading, whichever has higher reliability (see FIG. 18).

As a result, it is possible to perform AF control in which advantages of the PD division pixels and the light shielding pixels are obtained, and reliability of AF can be improved.

The thinning rate for setting some pixels to be read in the second reading in the embodiments may be variably set.

As a result, accurate phase difference demodulation can be performed according to the situation. For example, by changing the thinning rate according to the brightness, the number of pixels to be subjected to the second reading can be reduced in a bright situation, and the second reading time can be shortened.

In the embodiments, an example has been described in which the first reading and the second reading are performed in a time division manner in a case where still image continuous shooting imaging is performed.

The influence that an unnatural edge is generated in an image by performing reading for image generation and reading for defocus amount calculation together is easily noticeable in the case of continuous shooting imaging. Therefore, in the case of continuous shooting imaging, it is particularly effective to avoid image deterioration by performing the first reading and the second reading in a time division manner.

The program according to the embodiments is, for example, a program for causing a CPU, a DSP, or the like, or a device including these to execute each process illustrated in FIGS. 11 and 12 and FIGS. 17 and 18.

That is, the program according to the embodiments is a program for causing an arithmetic processing device in the imaging device 1 including the imaging element 7 including the PD division pixels 21 to execute processing of performing, as reading corresponding to one frame of an image in a case where rolling shutter reading from the imaging element 7 is performed, first reading of reading an addition value of a first pixel and a second pixel constituting a PD division pixel 21 for all pixels as image generation targets and second reading of obtaining a value of the first pixel and a value of the second pixel for some pixels of the pixels as image generation targets in a time-division manner, and providing an exposure period for the first reading and an exposure period for the second reading separately. With such a program, the above-described imaging device 1 can be implemented.

A program for implementing such an imaging device 1 can be recorded in advance in an HDD as a recording medium built in a device such as the imaging device 1 or the like, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, a memory card, or the like. Such a removable recording medium can be provided as so-called package software.

Furthermore, such a program can be installed from a removable recording medium to a personal computer or the like, or can be downloaded from a download site via a network such as a local area network (LAN), the Internet, or the like.

In addition, such a program is suitable for providing the imaging device 1 of the embodiments in a wide range. For example, by downloading the program to a mobile terminal device such as a smartphone, a tablet, or the like having a camera function, a mobile phone, a personal computer, a game device, a video device, a personal digital assistant (PDA), or the like, these devices can be caused to function as the imaging device 1 of the present disclosure.

Note that the effects described in the present specification are merely examples and are not limited, and other effects may be provided.

The present technology can also adopt the following configurations.

(1)
An imaging device including:
an imaging element including a photodiode division pixel; and
a control unit that performs control such that, as reading corresponding to one frame of an image in a case where rolling shutter reading from the imaging element is performed, first reading that reads an addition value of a first pixel and a second pixel constituting the photodiode division pixel for all pixels as image generation targets, and second reading that can obtain a value of the first pixel and a value of the second pixel for some pixels of pixels as image generation targets are performed in a time division manner, and an exposure period for the first reading and an exposure period for the second reading are separately provided.

(2)
The imaging device according to (1),
in which processing of generating an image on the basis of the addition value obtained in the first reading is performed, and
phase difference demodulation processing using the value of the first pixel and the value of the second pixel obtained in the second reading is performed.

(3)
The imaging device according to (1) or (2),
in which the control unit executes the second reading after the first reading is completed as reading corresponding to one frame of an image.

(4)
The imaging device according to (1) or (2),
in which the control unit executes the first reading after the second reading is completed as reading corresponding to one frame of an image.

(5)
The imaging device according to any one of (1) to (4),
in which the control unit starts exposure for the second reading before the first reading is completed.

(6)
The imaging device according to any one of (1) to (5),
in which the control unit causes the second reading to be completed during exposure for the first reading.

(7)
The imaging device according to any one of (1) to (6),
in which in the second reading, reading of a value of one of the first pixel or the second pixel, and
reading of the addition value of the first pixel and the second pixel are performed.

(8)
The imaging device according to any one of (1) to (7),
in which the imaging element includes a light shielding pixel including a light shielding portion that shields one of a pair of light fluxes having passed through a pair of partial regions deviated in opposite directions to each other in a predetermined direction in an exit pupil and a light receiving element that receives another light flux, the light shielding pixel having a pupil division function,
the control unit controls to perform third reading of reading the light shielding pixel, and
phase difference demodulation processing is performed using a value of the light shielding pixel obtained in the third reading.

(9)
The imaging device according to (8),
in which as reading corresponding to one frame of an image, the third reading is performed before the second reading.

(10)
The imaging device according to (8),
in which as reading corresponding to one frame of an image, the second reading is performed before the third reading.

(11)
The imaging device according to any one of (8) to (10),
in which the third reading is performed together with the first reading.

(12)
The imaging device according to any one of (8) to (11),
in which focus control is performed by using a result of phase difference demodulation processing based on the second reading and a result of phase difference demodulation processing based on the third reading, whichever has higher reliability.

(13)
The imaging device according to any one of (1) to (12),
in which a thinning rate for setting some pixels to be read in the second reading is variably set.

(14)
The imaging device according to any one of (1) to (11),
in which in a case where still image continuous shooting imaging is performed, the first reading and the second reading are performed in a time-division manner.

(15)
An imaging method of an imaging device including an imaging element including a photodiode division pixel, in which as reading corresponding to one frame of an image in a case where rolling shutter reading from the imaging element is performed, first reading that reads an addition value of a first pixel and a second pixel constituting the photodiode division pixel for all pixels as image generation targets, and second reading that can obtain a value of the first pixel and a value of the second pixel for some pixels of pixels as image generation targets are performed in a time division manner, and an exposure period for the first reading and an exposure period for the second reading are separately provided.

REFERENCE SIGNS LIST

1 Imaging device
2 Camera housing
3 Lens barrel
6S Shutter button
7 Imaging element
8 Camera signal processing unit
8 a Phase difference demodulation unit
14 Camera control unit
21 PD division pixel
22A First pixel row
22B Second pixel row
23, 23R, 23L Light shielding pixel
40L Left PD
40R Right PD

The invention claimed is:

1. An imaging device, comprising:
an imaging element that includes a plurality of pixels, wherein
each of the plurality of pixels includes a photodiode division pixel, and
the image element is configured to perform a rolling shutter read operation; and
a control unit configured to:
control a first read operation and a second read operation based on the rolling shutter read operation, wherein
each of the first read operation and the second read operation corresponds to one frame of an image,
for each of the plurality of pixels, the first read operation includes an operation to read an addition value of a first value corresponding to a first sub pixel and a second value corresponding to a second sub pixel,
the photodiode division pixel includes the first sub pixel and the second sub pixel,
each of the plurality of pixels is an image generation target for the first read operation,
for each pixel of a set of pixels from the plurality of pixels, the second read operation includes an operation to read the first value and the second value, and
each pixel of the set of pixels is an image generation target for the second read operation,
a count of pixels in the set of pixels is different from a count of pixels of the plurality of pixels, and
perform the first read operation and the second read operation in a time division pattern, wherein an exposure period for the first read operation is different from an exposure period for the second read operation.

2. The imaging device according to claim 1, wherein the control unit is further configured to:
generate the image based on the addition value from the first read operation; and
control a phase difference demodulation process based on the first value and the second value from the second read operation.

3. The imaging device according to claim 1, wherein the control unit is further configured to execute, after completion of the first read operation, the second read operation corresponding to the one frame of the image.

4. The imaging device according to claim 1, wherein the control unit is further configured to execute, after completion of the second read operation, the first read operation corresponding to the one frame of the image.

5. The imaging device according to claim 1, wherein the control unit is further configured to start exposure for the second read operation before completion of the first read operation.

6. The imaging device according to claim 1, wherein the control unit is further configured to control the second read operation to complete in an exposure time period of the first read operation.

7. The imaging device according to claim 1, wherein the second read operation further includes:
an operation to read one of the first value or the second value; and
an operation to read the addition value of the first value and the second value.

8. The imaging device according to claim 1, wherein
the imaging element further includes a light shielding pixel that includes a light shielding portion and a light receiving element;
the light shielding pixel includes a pupil division function;
the light shielding portion is configured to shield a first light flux of a pair of light fluxes;
the pair of light fluxes passes through a pair of partial regions of an exit pupil;
a first partial region of the pair of partial regions deviates in a first direction opposite to a second direction of a second partial region of the pair of partial regions;
the light receiving element is configured to receive a second light flux of the pair of light fluxes; and
the control unit is further configured to:
control a third read operation to read a third value corresponding to the light shielding pixel, and
control a first phase difference demodulation process based on the third value.

9. The imaging device according to claim 8, wherein the control unit is further configured to execute, before the second read operation, the third read operation corresponding to the one frame of the image.

10. The imaging device according to claim 8, wherein the control unit is further configured to execute, before the third read operation, the second read operation corresponding to the one frame of the image.

11. The imaging device according to claim 8, wherein the control unit is further configured to execute the third read operation with the first read operation.

12. The imaging device according to claim 8, wherein the control unit is further configured to:
control a second phase difference demodulation process based on the second read operation;
determine a first reliability of a first result of the first phase difference demodulation process;
determine a second reliability of a second result of the second phase difference demodulation process;
determine a higher reliability from the first reliability and the second reliability; and execute focus control process based on the higher reliability and one of the first result or the second result.

13. The imaging device according to claim 1, wherein a thinning rate to determine the set of pixels for the second read operation is a variable rate.

14. The imaging device according to claim 1, wherein the control unit is further configured to control, based on a still image continuous shooting imaging operation, the first read operation and the second read operation in the time division pattern.

15. An imaging method, comprising:
   executing, by an imaging device, a rolling shutter reading operation, wherein
      the imaging device includes a plurality of pixels, and
      each of the plurality of pixels includes a photodiode division pixel;
   controlling a first reading operation and a second reading operation based on the rolling shutter reading operation, wherein
      each of the first reading operation and the second reading operation corresponds to one frame of an image,
      for each of the plurality of pixels, the first reading operation includes reading an addition value of a first value corresponding to a first sub pixel and a second value corresponding to a second sub pixel,
      the photodiode division pixel includes the first sub pixel and the second sub pixel,
      each of the plurality of pixels is an image generation target for the first reading operation,
      for each pixel of a set of pixels from the plurality of pixels, the second reading operation includes reading the first value and the second value, and
      each pixel of the set of pixels is an image generation target for the second reading operation, and
      a count of pixels in the set of pixels is different from a count of pixels of the plurality of pixels; and
   controlling execution of the first reading operation and the second reading operation in a time division pattern, wherein an exposure period for the first reading operation is different from an exposure period for the second reading operation.

* * * * *